(12) United States Patent
Hong

(10) Patent No.: US 12,375,972 B2
(45) Date of Patent: Jul. 29, 2025

(54) METHOD FOR TRANSMITTING BUFFER STATUS REPORT, ELECTRONIC DEVICE AND COMPUTER-READABLE STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/623,985

(22) PCT Filed: Jul. 4, 2019

(86) PCT No.: PCT/CN2019/094719
§ 371 (c)(1),
(2) Date: Dec. 30, 2021

(87) PCT Pub. No.: WO2021/000323
PCT Pub. Date: Jan. 7, 2021

(65) Prior Publication Data
US 2025/0220499 A1    Jul. 3, 2025

(51) Int. Cl.
*H04W 28/02* (2009.01)
*H04W 16/14* (2009.01)
(Continued)

(52) U.S. Cl.
CPC ....... *H04W 28/0278* (2013.01); *H04W 16/14* (2013.01); *H04W 60/04* (2013.01); *H04W 72/0446* (2013.01); *H04W 72/1268* (2013.01)

(58) Field of Classification Search
CPC . H04W 28/0278; H04W 16/14; H04W 60/04; H04W 72/0446; H04W 72/1268
See application file for complete search history.

(56) References Cited

U.S. PATENT DOCUMENTS

2017/0280507 A1* 9/2017 Wang ................ H04W 74/0833
2018/0160422 A1* 6/2018 Pathak .................. H04W 76/10
2019/0334663 A1* 10/2019 Dev ....................... H04L 1/1874

FOREIGN PATENT DOCUMENTS

IN    201641020834 A    12/2017

OTHER PUBLICATIONS

Indian Patent Application No. 202247004877, Office Action dated Jun. 10, 2022, 6 pages.

* cited by examiner

*Primary Examiner* — Eric Myers
(74) *Attorney, Agent, or Firm* — Cozen O'Connor

(57) ABSTRACT

A method for transmitting a buffer status report, for a terminal including a plurality of SIMs for connecting to a same operator (i.e., carrier) network, including: determining whether a first SIM in the plurality of SIMs has a first shared channel resource for transmitting a first buffer status report in response to the first SIM transmitting the first buffer status report to a base station; querying, in the plurality of SIMs, a second SIM having a second shared channel resource for transmitting a second buffer status report to the base station in response to the first SIM not having the first shared channel resource; and transmitting the first buffer status report and an association relationship between the first buffer status report and the first SIM to the base station on the second shared channel resource through the second SIM.

20 Claims, 20 Drawing Sheets determining whether a first SIM in the plurality of SIMs has a first shared channel resource for transmitting a first buffer status report in response to that the first SIM transmits the first buffer status report to a base station — S1 querying, in the plurality of SIMs, a second SIM having a second shared channel resource for transmitting a second buffer status report to that the first SIM does not have the first shared channel resource — S2 transmitting the first buffer status report and an association relationship between the first buffer status report and the first SIM to the base station on the second shared channel resource through the second SIM — S3

(51) Int. Cl.
*H04W 60/04* (2009.01)
*H04W 72/0446* (2023.01)
*H04W 72/1268* (2023.01)

METHOD FOR TRANSMITTING BUFFER STATUS REPORT, ELECTRONIC DEVICE AND COMPUTER-READABLE STORAGE MEDIUM

CROSS-REFERENCE TO RELATED APPLICATION

This application is a national phase of International Application No. PCT/CN2019/094719, filed on Jul. 4, 2019, the entire content of which is hereby incorporated by reference into this disclosure.

TECHNICAL FIELD

The disclosure relates to the field of communication technologies, and more specifically, to a method for transmitting a buffer status report, an apparatus for transmitting a buffer status report, an electronic device and a computer-readable storage medium.

BACKGROUND

In the related art, a plurality of subscriber identification modules (SIMs) are arranged in a terminal such as a mobile phone, so as to improve the communication flexibility of the terminal. Different SIMs correspond to different international mobile equipment identities (IMEIs), such that a network may authenticate the SIMs.

On this basis, the network treats different SIMs as unused terminals. When the SIMs transmit buffer status reports (BSRs) to base stations in the network, different SIMs transmit the BSRs separately. When a certain SIM does not have a resource for transmitting the buffer status report, this SIM needs to initiate a random access and the random access process may require a plurality of transmissions of information between the terminal and the base station, which occupies resources and time.

SUMMARY

According to a first aspect of the disclosure, a method for transmitting a buffer status report is provided, the method is applied to a terminal including a plurality of SIMs for connecting to a same operator (i.e., carrier) network. The method includes the following.

Determining whether a first SIM in the plurality of SIMs has a first shared channel resource for transmitting a first buffer status report in response to that the first SIM transmits the first buffer status report to a base station.

Querying, in the plurality of SIMs, a second SIM having a second shared channel resource for transmitting a second buffer status report to the base station in response to that the first SIM does not have the first shared channel resource.

Transmitting the first buffer status report and an association relationship between the first buffer status report and the first SIM to the base station on the second shared channel resource through the second SIM.

According to a second aspect of the disclosure, a method for transmitting a buffer status report is provided, the method is applied to a terminal including a plurality of SIMs for connecting to a same operator network. The method includes the following.

Determining whether a first SIM in the plurality of SIMs has a first shared channel resource for transmitting a first buffer status report in response to the first SIM transmitting the first buffer status report to a base station.

Determining whether the first SIM has a first control channel resource for transmitting a first scheduling request in response to the first SIM not having the first shared channel resource.

Querying a second SIM having a second shared channel resource for transmitting a second buffer status report to the base station in the plurality of SIMs in response to the first SIM not having the first control channel resource.

Transmitting the first buffer status report and an association relationship between the first buffer status report and the first SIM are transmitted to the base station on the second shared channel resource through the second SIM.

According to a third aspect of the disclosure, an electronic device is provided.

The electronic device includes a processor.

The electronic device further includes a memory for storing instructions executable by the processor.

The processor is configured to perform the method for transmitting the buffer status report according to any embodiment as described above.

According to a fourth aspect of the disclosure, a non-transitory computer-readable storage medium is provided. The non-transitory computer-readable storage medium has stored therein a computer program. The computer program is executed by a processor to perform the method for transmitting the buffer status report according to any embodiment as described above.

BRIEF DESCRIPTION OF THE DRAWINGS

In order to more clearly illustrate technical solutions in embodiments of the disclosure, a brief description of drawings used in embodiments is given below. The drawings in the following descriptions are only part embodiments of the disclosure, and for those skilled in the art, other drawings can be obtained according to these drawings without creative labor.

DETAILED DESCRIPTION

The technical solutions in the embodiments will be described below in conjunction with the drawings in the embodiments of the disclosure. The described embodiments are only a part of the embodiments of the disclosure, rather than all the embodiments. Based on the embodiments in the disclosure, all other embodiments obtained by those of ordinary skill in the art without creative work fall within the protection scope of the disclosure.

Figure 1:
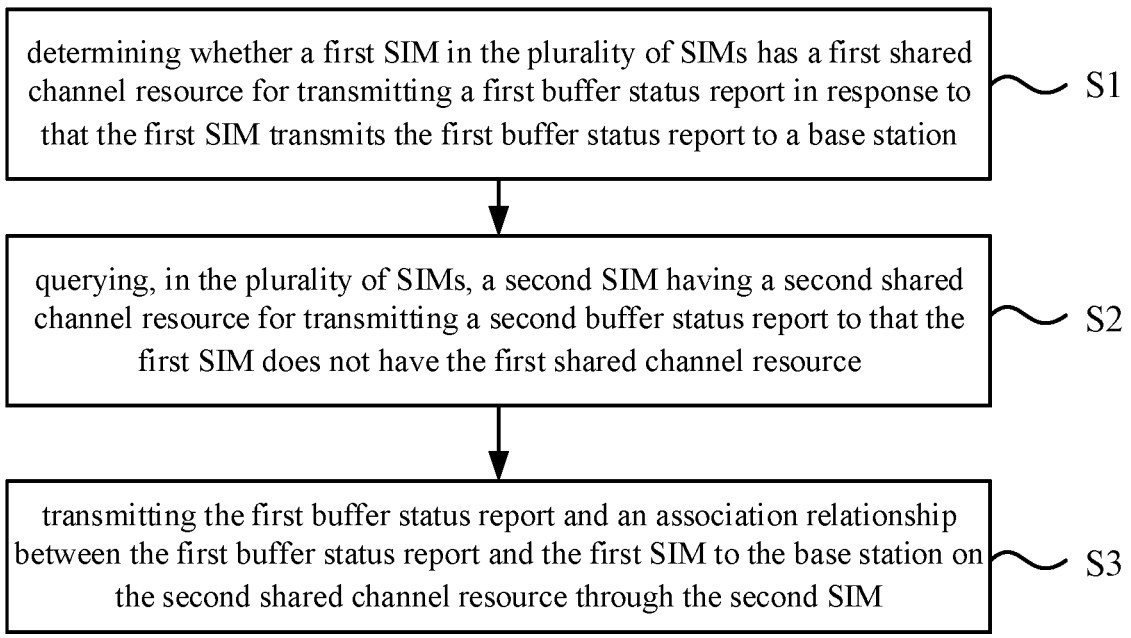
FIG. 1 is a flowchart illustrating a method for transmitting a buffer status report according to embodiments of the disclosure.

FIG. 1 is a flowchart illustrating a method for transmitting a buffer status report according to embodiments of the disclosure. The method illustrated in the embodiments of the disclosure may be applicable to a terminal. The terminal may communicate based on a multi-SIM single-standby (for example, dual-SIM single-standby) mode, a multi-SIM multi-standby (for example, dual-SIM dual-standby) mode or a multi-SIM multi-standby multi-pass (for example, dual-SIM dual-standby dual-pass) mode.

The terminal may be connected to at least two operator networks. For example, the terminal may be used as user equipment (UE) to communicate with a base station in the operator network. A plurality of SIMs may be arranged in the terminal. The SIM may be, for example a universal subscriber identification module (USIM). The plurality of SIMs may be connected to the same operator network, for example, the plurality of SIMs may be connected to the first operator network. In addition to the plurality of SIMs connected to the first operator network, the terminal may also be provided with a SIM connected to the second operator network. The first operator network and the second operator network are networks provided by different operators, for example, the first operator network may be China Mobile and the second operator network may be China Unicom or China Telecom.

The following embodiments exemplarily describe the technical solutions of the disclosure for SIMs connected to the same operator network.

As illustrated in FIG. 1, the method for transmitting the buffer status report is applicable to the terminal. The terminal includes a plurality of SIMs. The plurality of SIMs are configured to be connected to the same operator network. The method includes the following.

In S1, it is determined whether a first SIM in the plurality of SIMs has a first shared channel resource for transmitting a first buffer status report in response to that the first SIM transmits the first buffer status report to a base station.

In S2, a second SIM having a second shared channel resource for transmitting a second buffer status report to the base station is queried in the plurality of SIMs in response to that the first SIM does not have the first shared channel resource; and the first buffer status report is transmitted on the first shared channel resource in response to the first SIM having the first shared channel resource.

In S3, the first buffer status report and an association relationship between the first buffer status report and the first SIM are transmitted to the base station on the second shared channel resource through the second SIM.

In one embodiment, when the terminal needs to transmit information through the first SIM, it may transmit the first buffer status report to the base station to inform the base station of, the amount of data of the information to be transmitted by the first SIM, through the first buffer status report. Furthermore, the base station may configure the resource capable of transmitting the corresponding amount of data for the first SIM.

The first buffer status report may be set in a packet data unit (PDU) of a media access control (MAC) layer. However, the terminal needs a physical uplink shared channel (PUSCH) resource for transmitting the MAC PDU through the first SIM. If the base station does not configure the PUSCH resource for transmitting the buffer status report to the first SIM, the terminal may not directly transmit the buffer status report to the base station and needs to transmit a scheduling request (SR) to the base station to request the PUSCH. However, the terminal needs a physical uplink control channel (PUCCH) resource to transmit the scheduling request. If the base station does not configure the PUCCH resource for transmitting the scheduling request to the first SIM, the terminal needs to initiate a random access through the first SIM.

It should be noted that in the above embodiments and subsequent embodiments, the SIM has a certain resource, which means that the base station has configured the resource for the SIM and the resource is currently available; and the SIM does not have a certain resource, which means that the base station has configured the resource for the SIM and the resource is currently unavailable, or the base station does not configure the resource for the terminal.

In one embodiment, because different SIMs may transmit buffer status reports to the base station separately, different SIMs may be configured by the base station for PUSCH resources for transmitting buffer status reports. For example, when the first SIM does not have the first shared channel resource for transmitting the buffer status report, other SIMs in the plurality of SIMs may have resources for transmitting buffer status reports.

In the embodiments, when the first SIM does not have the first shared channel resource, the second SIM with the second shared channel resource for transmitting the second buffer status report to the base station may be queried in the plurality of SIMs. Furthermore, the first buffer status report and the association relationship between the first buffer status report and the first SIM may be transmitted to the base station on the second shared channel resource through the second SIM.

The base station may determine that the first buffer status report is a buffer status report of the first SIM based on the association relationship between the first buffer status report and the first SIM, and further configure the resource for the first SIM based on the first buffer status report.

Accordingly, when the first SIM does not have the first shared channel resource, the first buffer status report that the first SIM needs to transmit may be transmitted through the second SIM having the second shared channel resource, such that there is no need for the first SIM to transmit the scheduling request to the base station and further no need for the first SIM to initiate the random access, which shortens the duration for transmitting the first buffer status report to the base station and saves resources for information exchange between the first SIM and the base station.

It should be noted that when the first buffer status report and the association relationship between the first buffer status report and the first SIM are transmitted to the base station on the second shared channel resource through the second SIM, if the second SIM does not need to transmit the second buffer status report, only the first buffer status report and the association relationship between the first buffer status report and the first SIM are transmitted on the second shared channel. If the second SIM needs to transmit the second buffer status report, the second buffer status report, the first buffer status report and the association relationship between the first buffer status report and the first SIM are transmitted on the second shared channel.

Figure 2:
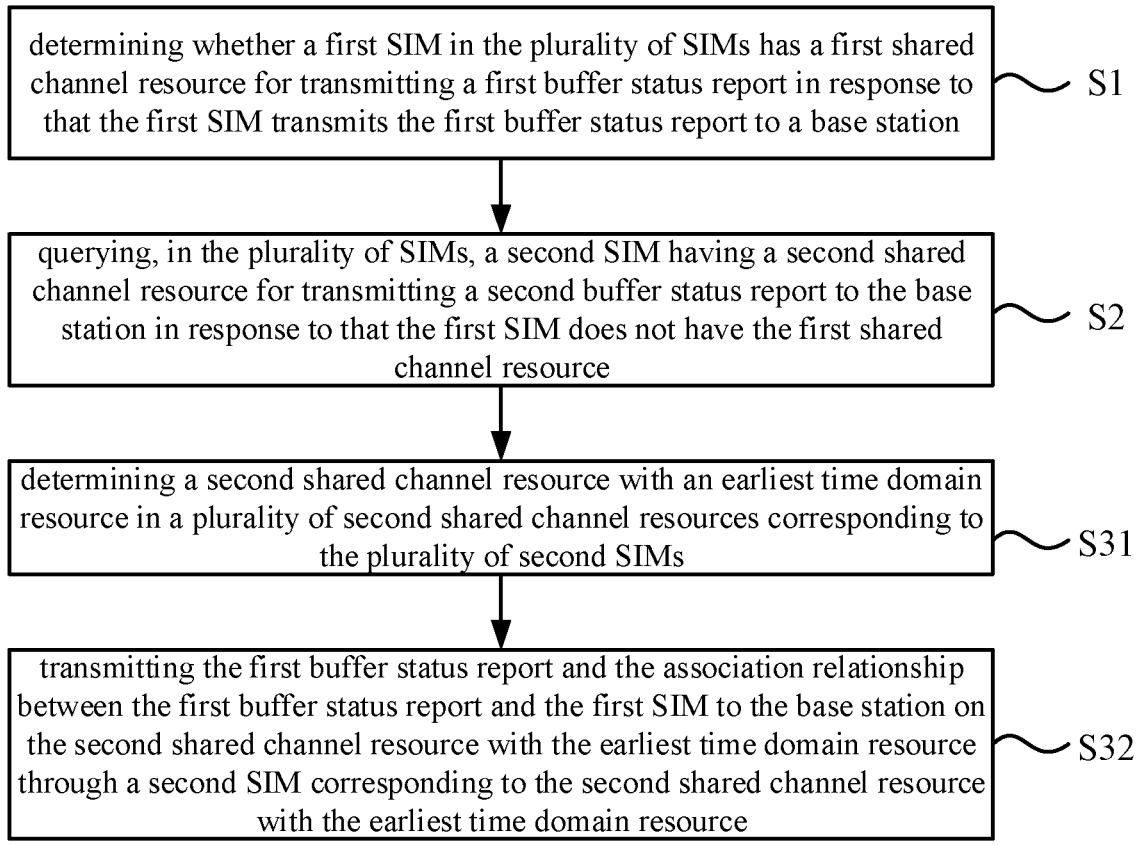
FIG. 2 is a flowchart illustrating another method for transmitting a buffer status report according to embodiments of the disclosure.
Figure 3:
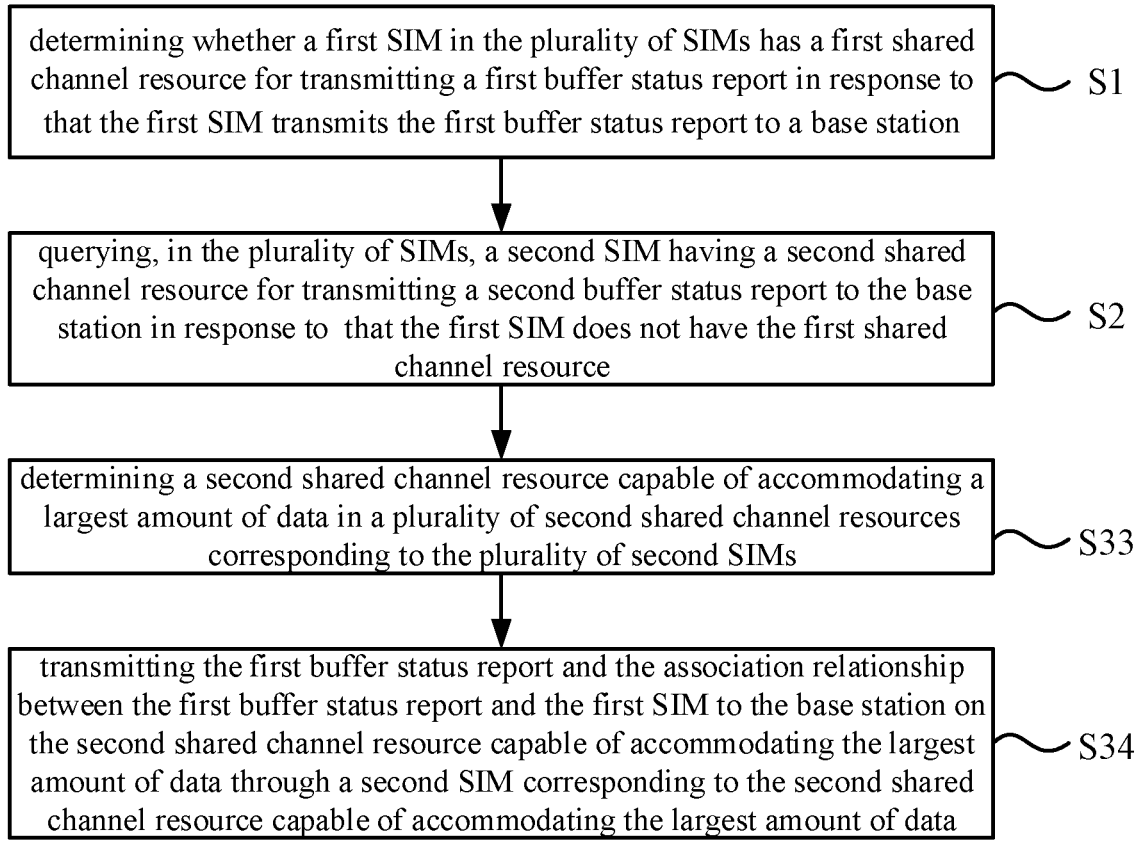
FIG. 3 is a flowchart illustrating still another method for transmitting a buffer status report according to embodiments of the disclosure.

FIG. 2 is a flowchart illustrating another method for transmitting a buffer status report according to embodiments of the disclosure. FIG. 3 is a flowchart illustrating still another method for transmitting a buffer status report according to embodiments of the disclosure.

As illustrated in FIG. 2, in response to a plurality of second SIMs being queried, transmitting the first buffer status report and the association relationship between the first buffer status report and the first SIM to the base station on the second shared channel resource through the second SIM includes the following.

In S31, a second shared channel resource with an earliest time domain resource in a plurality of second shared channel resources corresponding to the plurality of second SIMs is determined.

In S32, the first buffer status report and the association relationship between the first buffer status report and the first SIM are transmitted to the base station on the second shared channel resource with the earliest time domain resource through a second SIM corresponding to the second shared channel resource with the earliest time domain resource.

Alternatively, as illustrated in FIG. 3, in response to a plurality of second SIMs being queried, transmitting the first buffer status report and the association relationship between the first buffer status report and the first SIM to the base station on the second shared channel resource through the second SIM includes the following.

In S33, a second shared channel resource capable of accommodating a largest amount of data in a plurality of second shared channel resources corresponding to the plurality of second SIMs is determined.

In S34, the first buffer status report and the association relationship between the first buffer status report and the first SIM are transmitted to the base station on the second shared channel resource capable of accommodating the largest amount of data through a second SIM corresponding to the second shared channel resource capable of accommodating the largest amount of data.

In one embodiment, when the second SIM is queried in the plurality of SIMs, the plurality of second SIMs may be queried. That is, the plurality of SIMs are queried, which need to transmit buffer status reports to the base station and have PUSCH resources for transmitting the buffer status reports.

In this case, the time domain resource in the second shared channel resource of each second SIM may be determined. The second SIM corresponding to the second shared channel resource with the earliest time domain resource may be determined. The second buffer status report, the first buffer status report and the association relationship between the first buffer status report and the first SIM are transmitted to the base station on the second shared channel resource with the earliest time domain resource through the second SIM corresponding to the second shared channel resource with the earliest time domain resource.

Accordingly, the first buffer status report may be transmitted to the base station as soon as possible, so that the base station may configure the resource for the first SIM based on the first buffer status report as soon as possible. Therefore, the terminal may complete communication with the base station through the first SIM in time.

In one embodiment, when the second SIM is queried in the plurality of SIMS, the plurality of second SIMs may be queried. That is, the plurality of SIMs are queried, which need to transmit buffer status reports to the base station and have PUSCH resources for transmitting the buffer status reports.

In this case, the amount of data accommodated by the second shared channel resource of each second SIM is determined. The second SIM corresponding to the second shared channel resource capable of accommodating the largest amount of data is determined. The first buffer status report and the association relationship between the first buffer status report and the first SIM are transmitted to the base station on the second shared channel resource capable of accommodating the largest amount of data through the second SIM corresponding to the second shared channel resource capable of accommodating the largest amount of data.

Since the second shared channel resource configured by the base station for the second SIM is generally used to transmit the second buffer status report of the second SIM, the amount of data accommodated by the second shared channel resource is generally not very large. Therefore, it is possible that the first buffer status report and the association relationship between the first buffer status report and the first SIM may not be transmitted on the second shared channel resource.

With the embodiments of the disclosure, the first buffer status report and the association relationship between the first buffer status report and the first SIM are transmitted to the base station on the second shared channel resource capable of accommodating the largest amount of data through the second SIM corresponding to the second shared channel resource capable of accommodating the largest amount of data, which ensures that the second shared channel resource may accommodate the second buffer status report, the first buffer status report and the association relationship between the first buffer status report and the first SIM and ensures that the second buffer status report, the first buffer status report and the association relationship between the first buffer status report and the first SIM may be transmitted through the second shared channel resource at one time.

It should be noted that embodiments illustrated in FIG. 2 and FIG. 3 may be combined. When the second SIM corresponding to the second shared channel resource with the earliest time domain resource and the second SIM corresponding to the second shared channel resource capable of accommodating the largest amount of data are not the same SIM, it may be determined whether the second shared channel resource with the earliest time domain resource may accommodate the second buffer status report, the first buffer status report and the association relationship between the first buffer status report and the first SIM.

If yes, the first buffer status report and the association relationship between the first buffer status report and the first SIM are transmitted through the second SIM corresponding to the second shared channel resource with the earliest time domain resource, to ensure that the second buffer status report, the first buffer status report and the association relationship between the first buffer status report and the first SIM may be transmitted to the base station at one time, so that the first buffer status report is transmitted to the base station as soon as possible.

If not, the first buffer status report and the association relationship between the first buffer status report and the first SIM are transmitted through the second SIM corresponding to the second shared channel resource capable of accommodating the largest amount of data, to ensure that the second buffer status report, the first buffer status report and the association relationship between the first buffer status report and the first SIM may be transmitted to the base station at one time, reducing the number of communications between the terminal and the base station and saving communication resources.

Figure 4:
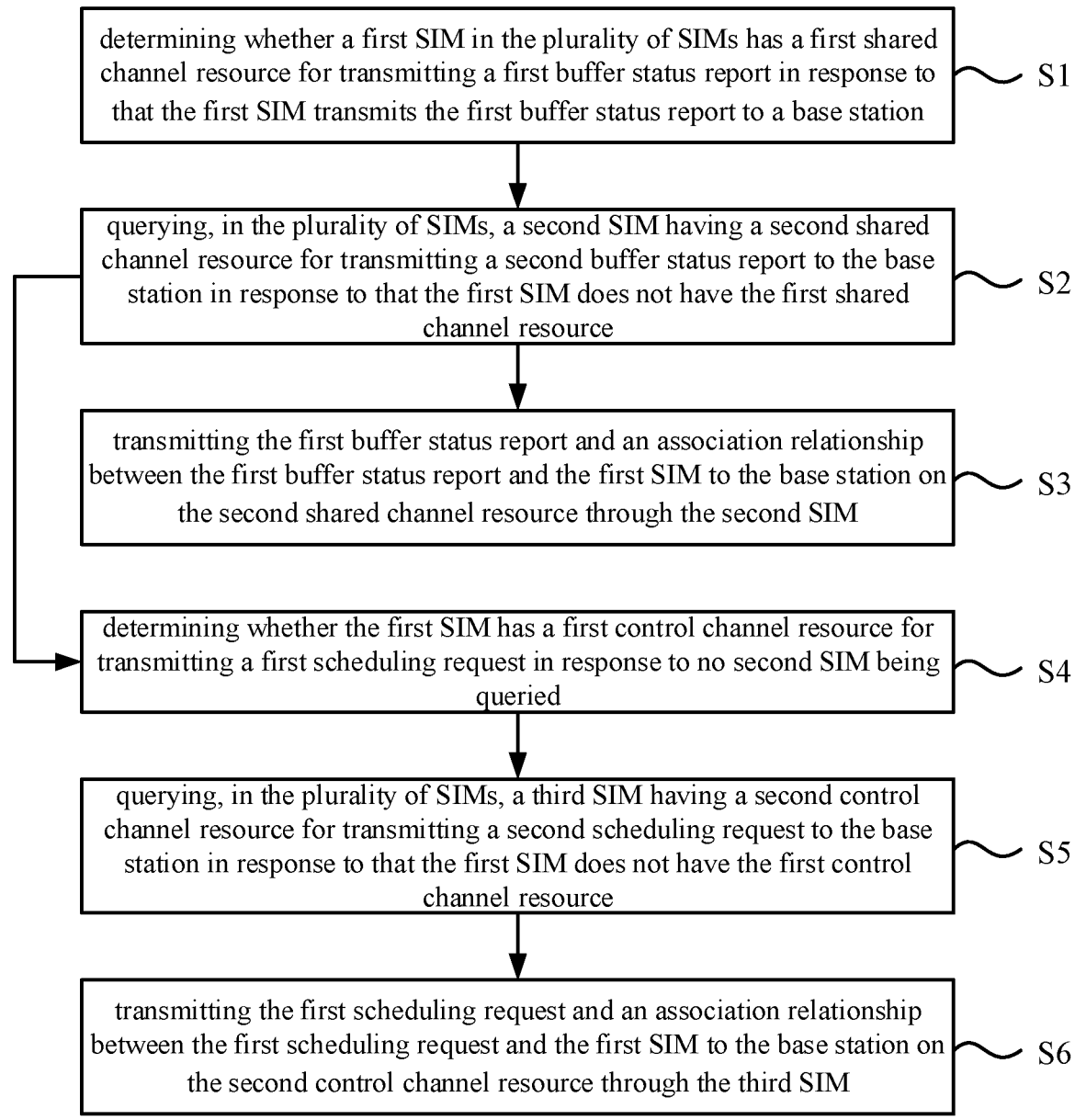
FIG. 4 is a flowchart illustrating still another method for transmitting a buffer status report according to embodiments of the disclosure.

FIG. 4 is a flowchart illustrating still another method for transmitting a buffer status report according to embodiments of the disclosure. As illustrated in FIG. 4, the method further includes the following.

In S4, it is determined whether the first SIM has a first control channel resource for transmitting a first scheduling request in response to no second SIM being queried; and a first scheduling request is transmitted on the first control channel resource in response to the first SIM having the first control channel resource.

In S5, a third SIM having a second control channel resource for transmitting a second scheduling request to the base station is queried in the plurality of SIMs in response to that the first SIM does not have the first control channel resource.

In S6, the first scheduling request and an association relationship between the first scheduling request and the first SIM are transmitted to the base station on the second control channel resource through the third SIM.

In one embodiment, if the second SIM is not queried, it may be determined that all SIMs in the terminal do not have PUSCH resources for transmitting the buffer status reports, and the first scheduling request needs to be transmitted to the base station through the first SIM. Therefore, it is determined whether the first SIM has the first control channel resource for transmitting the first scheduling request.

Since different SIMs transmit scheduling requests to the base station respectively, different SIMs may be configured by the base station for PUCCH resources for transmitting scheduling requests. For example, when the first SIM does not have the first control channel resource for transmitting the scheduling request, other SIMs in the plurality of SIMs may have control channel resources for transmitting scheduling requests.

Therefore, when the first SIM does not have the first control channel resource, the third SIM that needs the second control channel resource for transmitting the second scheduling request to the base station may be queried in the plurality of SIMs. Furthermore, the first scheduling request and the association relationship between the first scheduling request and the first SIM are transmitted to the base station on the second control channel resource through the queried third SIM.

The base station may configure the resource for the third SIM based on the second scheduling request and determine that the first scheduling request is a scheduling request of the first SIM based on the association relationship between the first scheduling request and the first SIM. Therefore, the resource may be configured for the first SIM based on the first scheduling request.

Accordingly, when the first SIM does not have the first control channel resource, the first scheduling request that the first SIM needs to transmit may be transmitted through the third SIM with the second control channel resource, so that the first SIM does not need to initiate the random access to the base station, which shortens the duration for transmitting the first buffer status report to the base station and saves resources for information exchange between the first SIM and the base station.

It should be noted that when the first buffer status report and the association relationship between the first scheduling request and the first SIM are transmitted to the base station on the second control channel resource through the second SIM, if the second SIM does not need to transmit the second scheduling request, only the first scheduling request and the association relationship between the first scheduling request and the first SIM may be transmitted on the second shared channel. If the second SIM needs to transmit the second scheduling request, the first scheduling request and the association relationship between the first scheduling request and the first SIM are transmitted on the second shared channel.

Figure 5:
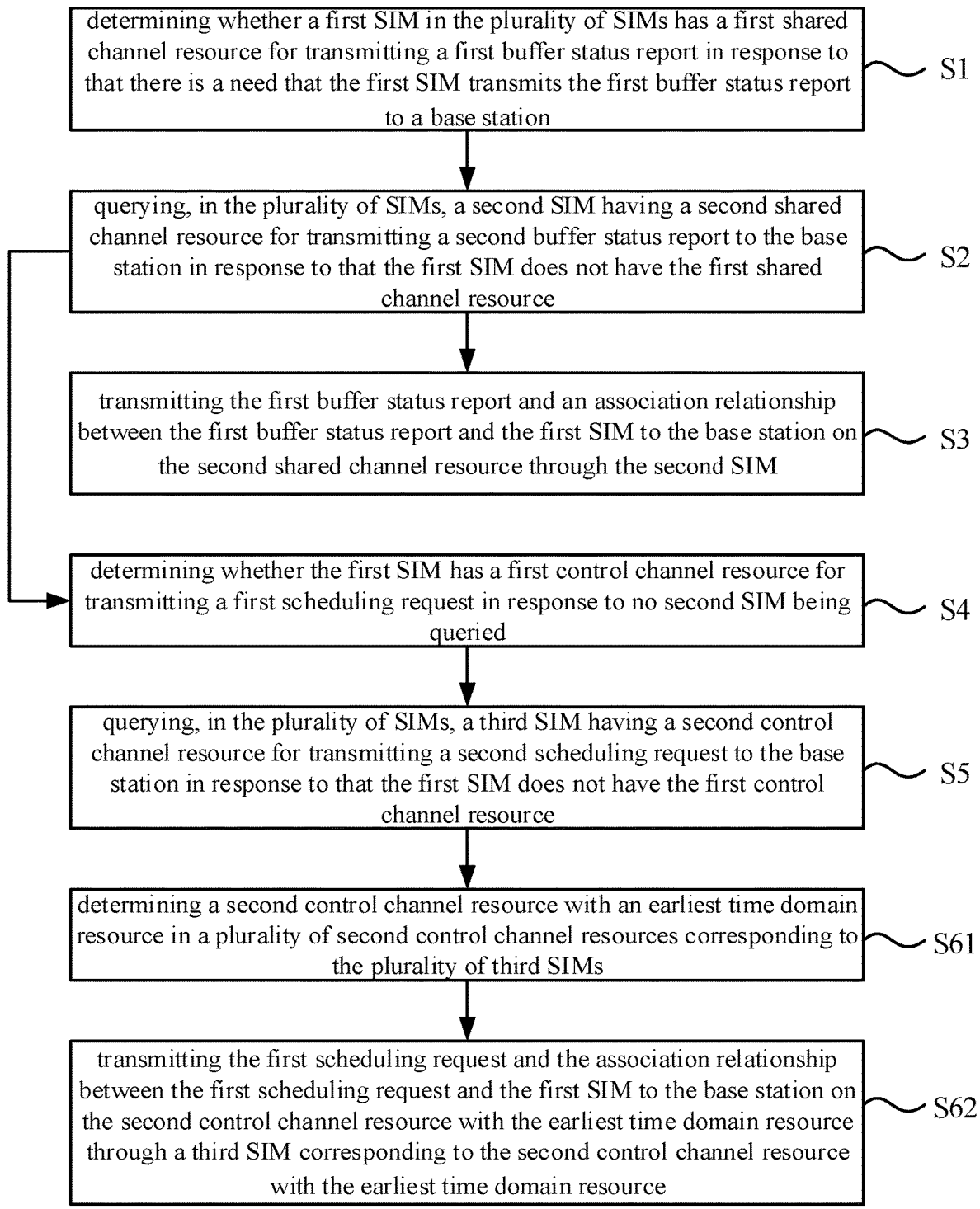
FIG. 5 is a flowchart illustrating still another method for transmitting a buffer status report according to embodiments of the disclosure.
Figure 6:
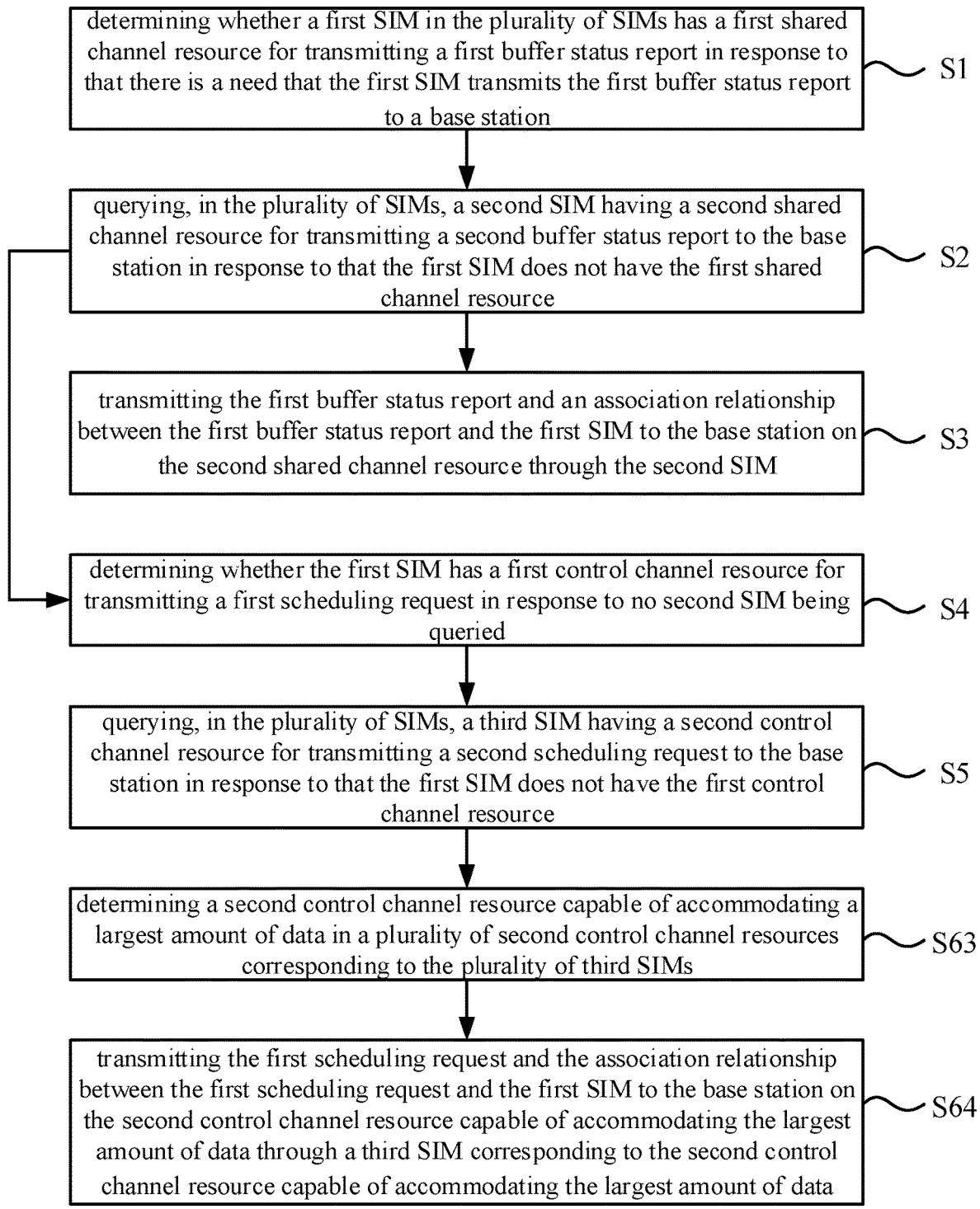
FIG. 6 is a flowchart illustrating still another method for transmitting a buffer status report according to embodiments of the disclosure.

FIG. 5 is a flowchart illustrating still another method for transmitting a buffer status report according to embodiments of the disclosure. FIG. 6 is a flowchart illustrating still another method for transmitting a buffer status report according to embodiments of the disclosure.

As illustrated in FIG. 5, in response to a plurality of third SIMs being queried, transmitting the first scheduling request and the association relationship between the first scheduling request and the first SIM to the base station on the second control channel resource through the third SIM includes the following.

In S61, a second control channel resource with an earliest time domain resource in a plurality of second control channel resources corresponding to the plurality of third SIMs is determined.

In S62, the first scheduling request and the association relationship between the first scheduling request and the first SIM are transmitted to the base station on the second control channel resource with the earliest time domain resource through a third SIM corresponding to the second control channel resource with the earliest time domain resource.

Alternatively, as illustrated in FIG. 6, in response to a plurality of third SIMs being queried, transmitting the first scheduling request and the association relationship between the first scheduling request and the first SIM to the base station on the second control channel resource through the third SIM includes the following.

In S63, a second control channel resource capable of accommodating a largest amount of data in a plurality of second control channel resources corresponding to the plurality of third SIMs is determined.

In S64, the first scheduling request and the association relationship between the first scheduling request and the first SIM are transmitted to the base station on the second control channel resource capable of accommodating the largest amount of data through a third SIM corresponding to the second control channel resource capable of accommodating the largest amount of data.

In one embodiment, when the third SIM is queried in the plurality of SIMs, the plurality of third SIMs may be queried. That is, the plurality of SIMs are queried, which need to transmit scheduling requests to the base station and have PUCCH resources for transmitting the scheduling requests.

In this case, the time domain resource in the second control channel resource of each third SIM may be determined. The third SIM corresponding to the second control channel resource with the earliest time domain resource may be determined. The first scheduling request and the association relationship between the first scheduling request and the first SIM are transmitted to the base station on the second control channel resource with the earliest time domain resource through the third SIM corresponding to the second control channel resource with the earliest time domain resource.

Accordingly, the first scheduling request may be transmitted to the base station as soon as possible, so that the base station may configure the resource for the first SIM based on the first scheduling request as soon as possible. Therefore, the terminal may complete communication with the base station through the first SIM in time.

In one embodiment, when the third SIM is queried in the plurality of SIMs, the plurality of third SIMs may be queried. That is, the plurality of SIMs are queried, which need to transmit scheduling requests to the base station and have PUCCH resources for transmitting the scheduling requests.

In this case, the amount of data accommodated by the second control channel resource of each third SIM may be determined. The third SIM corresponding to the second control channel resource capable of accommodating the largest amount of data may be determined. The first scheduling request and the association relationship between the first scheduling request and the first SIM are transmitted to the base station on the second control channel resource capable of accommodating the largest amount of data through the third SIM corresponding to the second control channel resource capable of accommodating the largest amount of data.

Since the second control channel resource configured by the base station for the third SIM is generally used to transmit the second scheduling request of the third SIM, the amount of data accommodated by the second control channel resource is generally not very large. It is possible that the first scheduling request and the association relationship between the first scheduling request and the first SIM may not be transmitted on the second control channel resource.

With the embodiments of the disclosure, the first scheduling request and the association relationship between the first scheduling request and the first SIM are transmitted to the base station on the second control channel resource capable of accommodating the largest amount of data through the third SIM corresponding to the second control channel resource capable of accommodating the largest amount of data, which ensures that the second control channel resource may accommodate the first scheduling request and the association relationship between the first scheduling request and the first SIM and ensures that the first scheduling request and the association relationship between the first scheduling request and the first SIM are transmitted to the base station at one time.

It should be noted that the embodiments illustrated in FIG. 5 and FIG. 6 may be combined. When the third SIM corresponding to the second control channel resource with the earliest time domain resource and the third SIM corresponding to the second control channel resource capable of accommodating the largest amount of data are not the same SIM, it may be determined whether the second control channel resource with the earliest time domain resource may accommodate the first scheduling request and the association relationship between the first scheduling request and the first SIM.

If yes, the first scheduling request and the association relationship between the first scheduling request and the first SIM are transmitted through the third SIM corresponding to the second control channel resource with the earliest time domain resource, to ensure that the first scheduling request and the association relationship between the first scheduling request and the first SIM may be transmitted to the base station at one time, so that the first scheduling request is transmitted to the base station as soon as possible.

If not, the first scheduling request and the association relationship between the first scheduling request and the first SIM are transmitted through the third SIM corresponding to the second control channel resource capable of accommodating the largest amount of data, to ensure that the first scheduling request and the association relationship between the first scheduling request and the first SIM may be transmitted to the base station at one time, reducing the number of communications between the terminal and the base station and saving communication resources.

Figure 7:
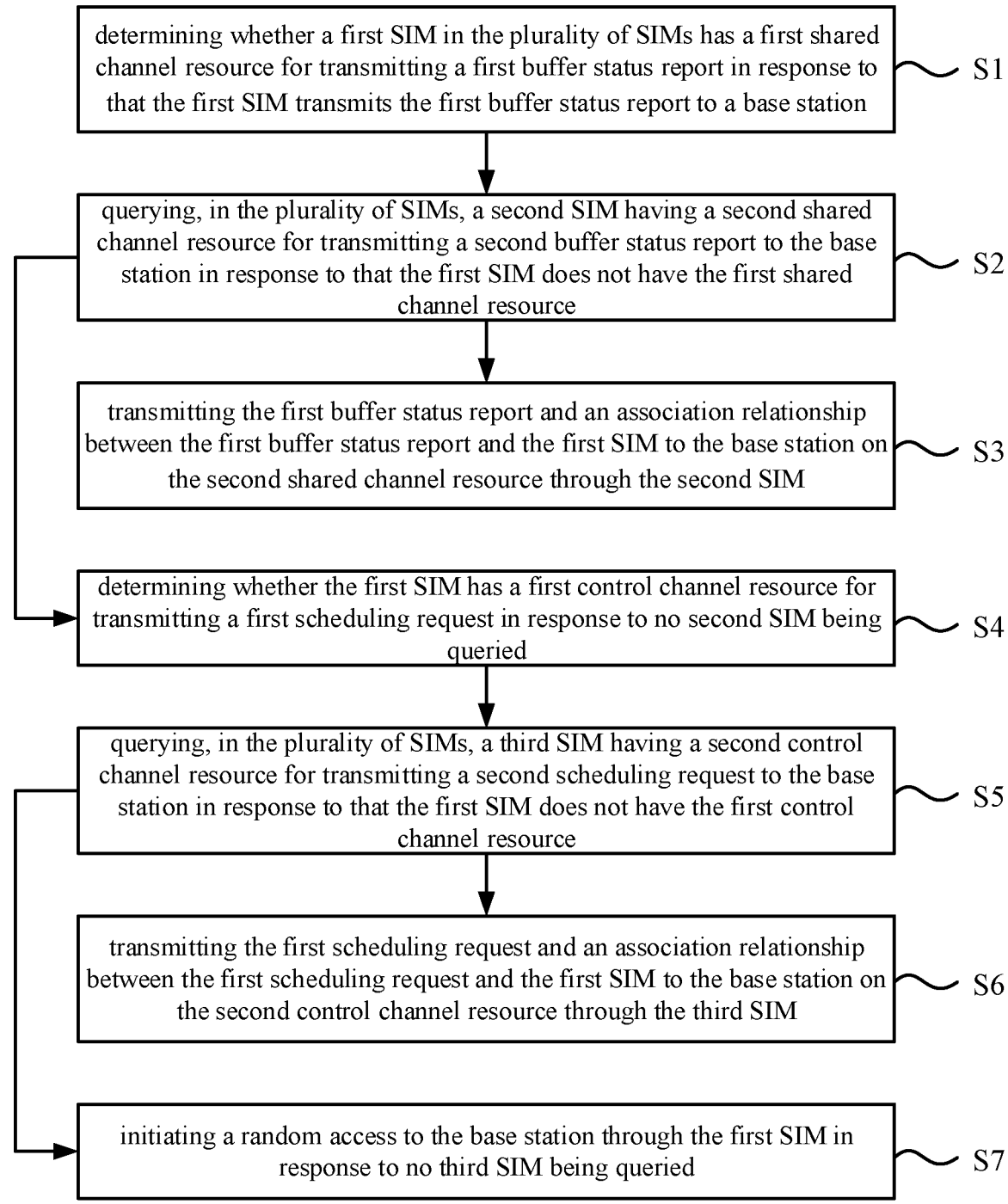
FIG. 7 is a flowchart illustrating still another method for transmitting a buffer status report according to embodiments of the disclosure.

FIG. 7 is a flowchart illustrating still another method for transmitting a buffer status report according to embodiments of the disclosure. As illustrated in FIG. 7, the method further includes the following.

In S7, a random access to the base station is initiated through the first SIM in response to no third SIM being queried.

In one embodiment, if the third SIM is not queried, it may be determined that all SIMs in the terminal do not have PUCCH resources for transmitting scheduling requests, and the random access may be initiated to the base station through the first SIM to establish the communication with the base station to complete communication.

Figure 8:
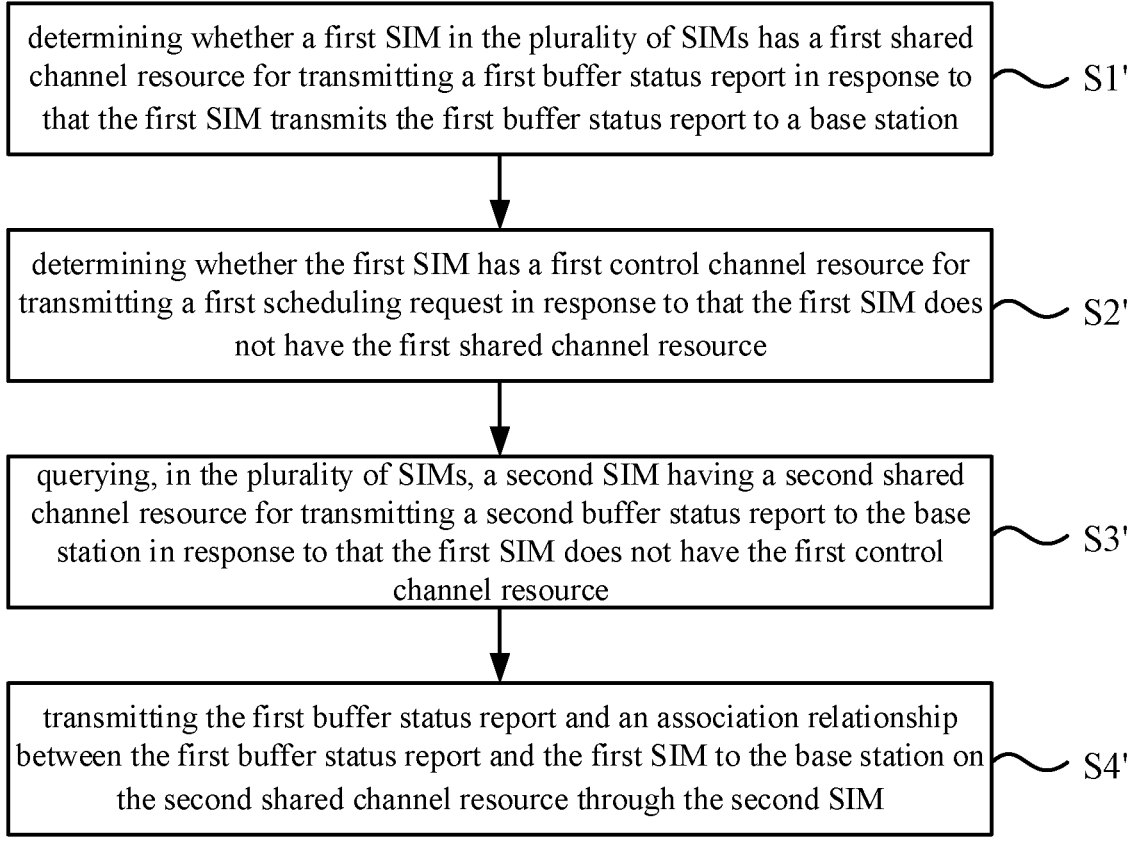
FIG. 8 is a flowchart illustrating a method for transmitting a buffer status report according to embodiments of the disclosure.

FIG. 8 is a flowchart illustrating a method for transmitting a buffer status report according to embodiments of the disclosure. The method illustrated in the embodiments of the disclosure may be applicable to a terminal. The terminal may communicate based on a multi-SIM single-standby (for example, dual-SIM single-standby) mode, a multi-SIM multi-standby (for example, dual-SIM dual-standby) mode or a multi-SIM multi-standby multi-pass (for example, dual-SIM dual-standby dual-pass) mode.

The terminal may be connected to at least two operator networks. For example, the terminal may be used as UE to communicate with a base station in the operator network. A plurality of SIMs may be arranged in the terminal. The SIM may be, for example a USIM. The plurality of SIMs may be connected to the same operator network, for example, the plurality of SIMs may be connected to the first operator network. In addition to the plurality of SIMs connected to the first operator network, the terminal may also be provided with a SIM connected to the second operator network. The first operator network and the second operator network are networks provided by different operators, for example, the first operator network may be China Mobile and the second operator network may be China Unicom or The following embodiments exemplarily describe the technical solutions of the disclosure for SIMs connected to the same operator network.

As illustrated in FIG. 8, the method for transmitting the buffer status report is applicable to the terminal. The terminal includes a plurality of SIMs. The plurality of SIMs are configured to be connected to the same operator network. The method includes the following.

In S1', it is determined whether a first SIM in the plurality of SIMs has a first shared channel resource for transmitting a first buffer status report in response to that the first SIM transmits the first buffer status report to a base station; and the first buffer status report is transmitted on the first shared channel resource in response to the first SIM having the first shared channel resource.

In S2', it is determined whether the first SIM has a first control channel resource for transmitting a first scheduling request in response to that the first SIM does not have the first shared channel resource; and the first scheduling request is transmitted on the first control channel resource in response to the first SIM having the first control channel resource.

In S3', a second SIM having a second shared channel resource for transmitting a second buffer status report to the base station is queried in the plurality of SIMs in response to that the first SIM does not have the first control channel resource.

In S4', the first buffer status report and an association relationship between the first buffer status report and the first SIM are transmitted to the base station on the second shared channel resource through the second SIM.

In one embodiment, when the terminal needs to transmit information through the first SIM, it may transmit the first buffer status report to the base station to inform the base station of, the amount of data of the information to be transmitted by the first SIM, through the first buffer status report. Furthermore, the base station may configure the resource capable of transmitting the corresponding amount of data for the first SIM.

The first buffer status report may be set in a PDU of a MAC layer. However, the terminal needs a PUSCH resource for transmitting the MAC PDU through the first SIM. If the base station does not configure the PUSCH resource for transmitting the buffer status report to the first SIM, the terminal may not directly transmit the buffer status report to the base station and needs to transmit a scheduling request to the base station to request the PUSCH. However, the terminal needs a PUCCH resource to transmit the scheduling request. If the base station does not configure the PUCCH resource for transmitting the scheduling request to the first SIM, the terminal needs to initiate a random access through the first SIM.

It should be noted that in the above embodiments and subsequent embodiments, the SIM has a certain resource, which means that the base station has configured the resource for the SIM and the resource is currently available; and the SIM does not have a certain resource, which means that the base station has configured the resource for the SIM and the resource is currently unavailable, or the base station does not configure the resource for the terminal.

In one embodiment, since different SIMs may transmit buffer status reports to the base station respectively, different SIMs may be configured by the base station for PUSCH resources for transmitting buffer status reports. For example, when the first SIM does not have the first shared channel resource for transmitting the buffer status report, other SIMs in the plurality of SIMs may have resources for transmitting the buffer status reports.

In the embodiments, when the first SIM does not have the first shared channel resource and further does not have the first control channel resource for transmitting the first scheduling request, the second SIM that needs to transmit the second buffer status report to the base station and have the second shared channel resource for transmitting the second buffer status report may be queried in the plurality of SIMs. The first buffer status report and the association relationship between the first buffer status report and the first SIM are transmitted to the base station on the second shared channel resource through the second SIM.

The base station may configure the resource for the second SIM based on the second buffer status report and determine that the first buffer status report is a buffer status report of the first SIM based on the association relationship between the first buffer status report and the first SIM. Therefore, the resource may be configured for the first SIM based on the first buffer status report.

Accordingly, when the first SIM does not have the first shared channel resource and further does not have the first control channel resource for transmitting the first scheduling request, the first buffer status report that the first SIM needs to transmit may be transmitted through the second SIM with the second shared channel resource. There is no need for the first SIM to initiate the random access, which shortens the duration for transmitting the first buffer status report to the base station and saves resources of interaction information between the first SIM and the base station.

It should be noted that when the first buffer status report and the association relationship between the first buffer status report and the first SIM are transmitted to the base station on the second shared channel resource through the second SIM, if the second SIM does not need to transmit the second buffer status report, only the first buffer status report and the association relationship between the first buffer status report and the first SIM are transmitted on the second shared channel. If the second SIM needs to transmit the second buffer status report, the second buffer status report, the first buffer status report and the association relationship between the first buffer status report and the first SIM are transmitted on the second shared channel.

Figure 9:
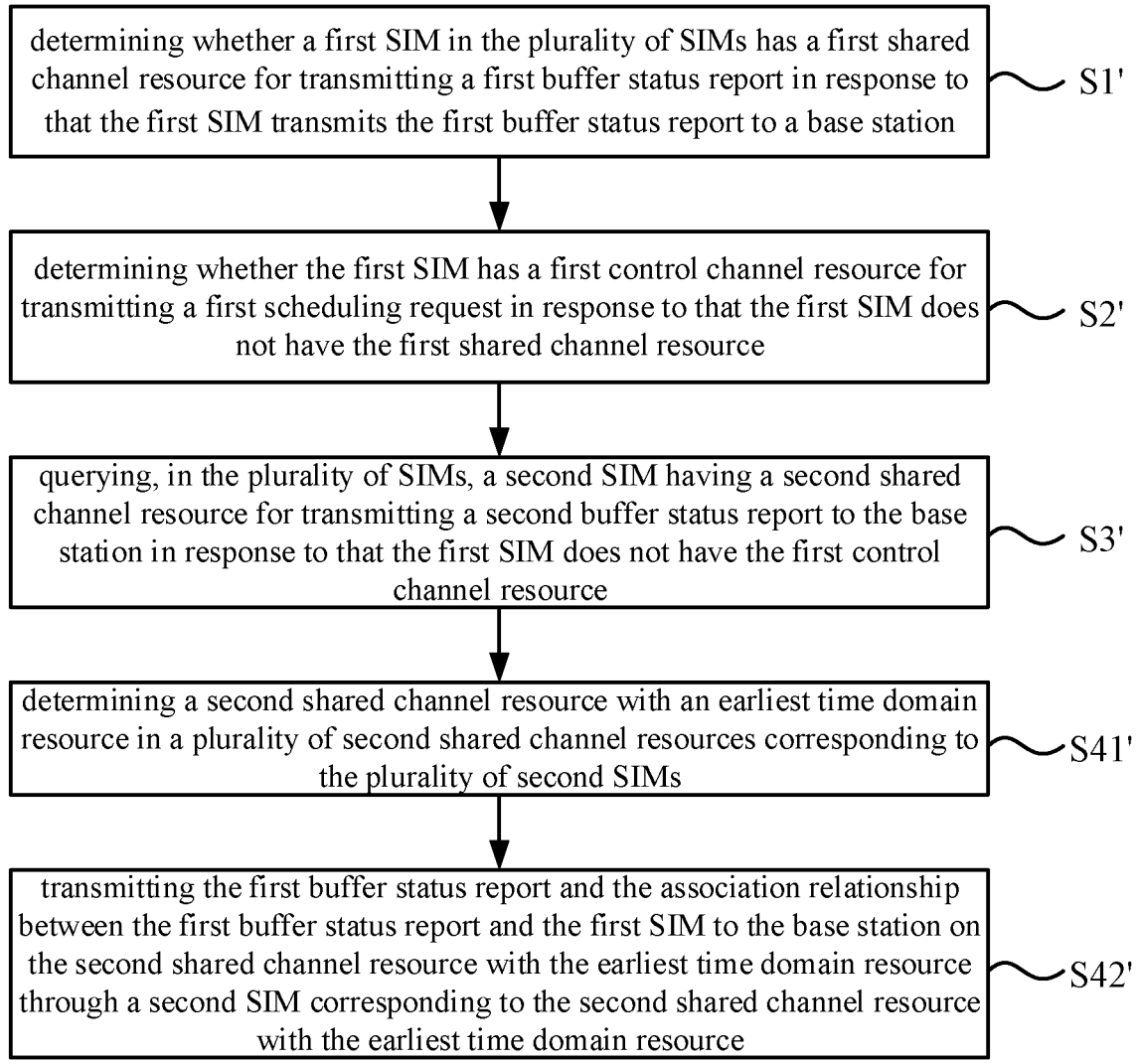
FIG. 9 is a flowchart illustrating another method for transmitting a buffer status report according to embodiments of the disclosure.
Figure 10:
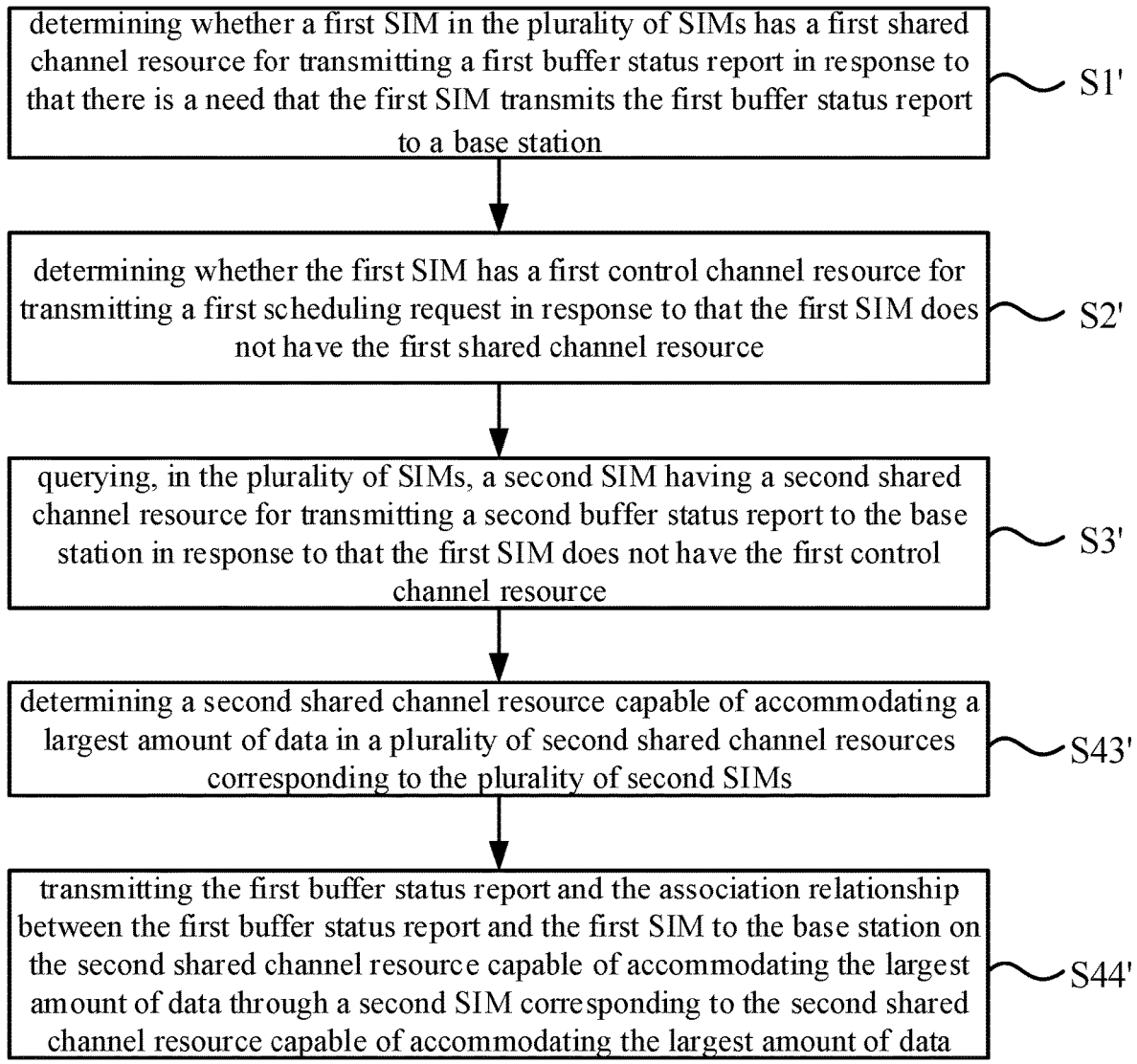
FIG. 10 is a flowchart illustrating still another method for transmitting a buffer status report according to embodiments of the disclosure.

FIG. 9 is a flowchart illustrating another method for transmitting a buffer status report according to embodiments of the disclosure. FIG. 10 is a flowchart illustrating still another method for transmitting a buffer status report according to embodiments of the disclosure.

As illustrated in FIG. 9, in response to a plurality of second SIMs being queried, transmitting the first buffer status report and the association relationship between the first buffer status report and the first SIM to the base station on the second shared channel resource through the second SIM includes the following.

In S41', a second shared channel resource with an earliest time domain resource in a plurality of second shared channel resources corresponding to the plurality of second SIMs is determined.

In S42', the first buffer status report and the association relationship between the first buffer status report and the first SIM are transmitted to the base station on the second shared channel resource with the earliest time domain resource through a second SIM corresponding to the second shared channel resource with the earliest time domain resource.

Alternatively, as illustrated in FIG. 10, in response to a plurality of second SIMs being queried, transmitting the first buffer status report and the association relationship between the first buffer status report and the first SIM to the base station on the second shared channel resource through the second SIM includes the following.

In S43', a second shared channel resource capable of accommodating a largest amount of data in a plurality of second shared channel resources corresponding to the plurality of second SIMs is determined.

In S44', the first buffer status report and the association relationship between the first buffer status report and the first SIM are transmitted to the base station on the second shared channel resource capable of accommodating the largest amount of data through a second SIM corresponding to the second shared channel resource capable of accommodating the largest amount of data.

In one embodiment, when the second SIM is queried in the plurality of SIMs, the plurality of second SIMs may be queried. That is, the plurality of SIMs are queried, which need to transmit buffer status reports to the base station and have PUSCH resources for transmitting the buffer status reports.

In this case, the time domain resource in the second shared channel resource of each second SIM may be determined. The second SIM corresponding to the second shared channel resource with the earliest time domain resource may be determined. The second buffer status report, the first buffer status report and the association relationship between the first buffer status report and the first SIM are transmitted to the base station on the second shared channel resource with the earliest time domain resource through the second SIM corresponding to the second shared channel resource with the earliest time domain resource.

Accordingly, the first buffer status report may be transmitted to the base station as soon as possible, so that the base station may configure the resource for the first SIM based on the first buffer status report as soon as possible. Therefore, the terminal may complete communication with the base station through the first SIM in time.

In one embodiment, when the second SIM is queried in the plurality of SIMs, the plurality of second SIMs may be queried. That is, the plurality of SIMs are queried, which need to transmit buffer status reports to the base station and have PUSCH resources for transmitting the buffer status reports.

In this case, the amount of data accommodated by the second shared channel resource of each second SIM is determined. The second SIM corresponding to the second shared channel resource capable of accommodating the largest amount of data is determined. The first buffer status report and the association relationship between the first buffer status report and the first SIM are transmitted to the base station on the second shared channel resource capable of accommodating the largest amount of data through the second SIM corresponding to the second shared channel resource capable of accommodating the largest amount of data.

Since the second shared channel resource configured by the base station for the second SIM is generally used to transmit the second buffer status report of the second SIM, the amount of data accommodated by the second shared channel resource is generally not very large. Therefore, it is possible that the first buffer status report and the association relationship between the first buffer status report and the first SIM may not be transmitted on the second shared channel resource.

With the embodiments of the disclosure, the first buffer status report and the association relationship between the first buffer status report and the first SIM are transmitted to the base station on the second shared channel resource capable of accommodating the largest amount of data through the second SIM corresponding to the second shared channel resource capable of accommodating the largest amount of data, which ensures that the second shared channel resource may accommodate the second buffer status report, the first buffer status report and the association relationship between the first buffer status report and the first SIM and ensures that the second buffer status report, the first buffer status report and the association relationship between the first buffer status report and the first SIM may be transmitted through the second shared channel resource at one time.

It should be noted that embodiments illustrated in FIG. 9 and FIG. 10 may be combined. When the second SIM corresponding to the second shared channel resource with the earliest time domain resource and the second SIM corresponding to the second shared channel resource capable of accommodating the largest amount of data are not the same SIM, it may be determined whether the second shared channel resource with the earliest time domain resource may accommodate the second buffer status report, the first buffer status report and the association relationship between the first buffer status report and the first SIM.

If yes, the first buffer status report and the association relationship between the first buffer status report and the first SIM are transmitted through the second SIM corresponding to the second shared channel resource with the earliest time domain resource, to ensure that the second buffer status report, the first buffer status report and the association relationship between the first buffer status report and the first SIM may be transmitted to the base station at one time, so that the first buffer status report is transmitted to the base station as soon as possible.

If not, the first buffer status report and the association relationship between the first buffer status report and the first SIM are transmitted through the second SIM corresponding to the second shared channel resource capable of accommodating the largest amount of data, to ensure that the second buffer status report, the first buffer status report and the association relationship between the first buffer status report and the first SIM may be transmitted to the base station at one time, reducing the number of communications between the terminal and the base station and saving communication resources.

Figure 11:
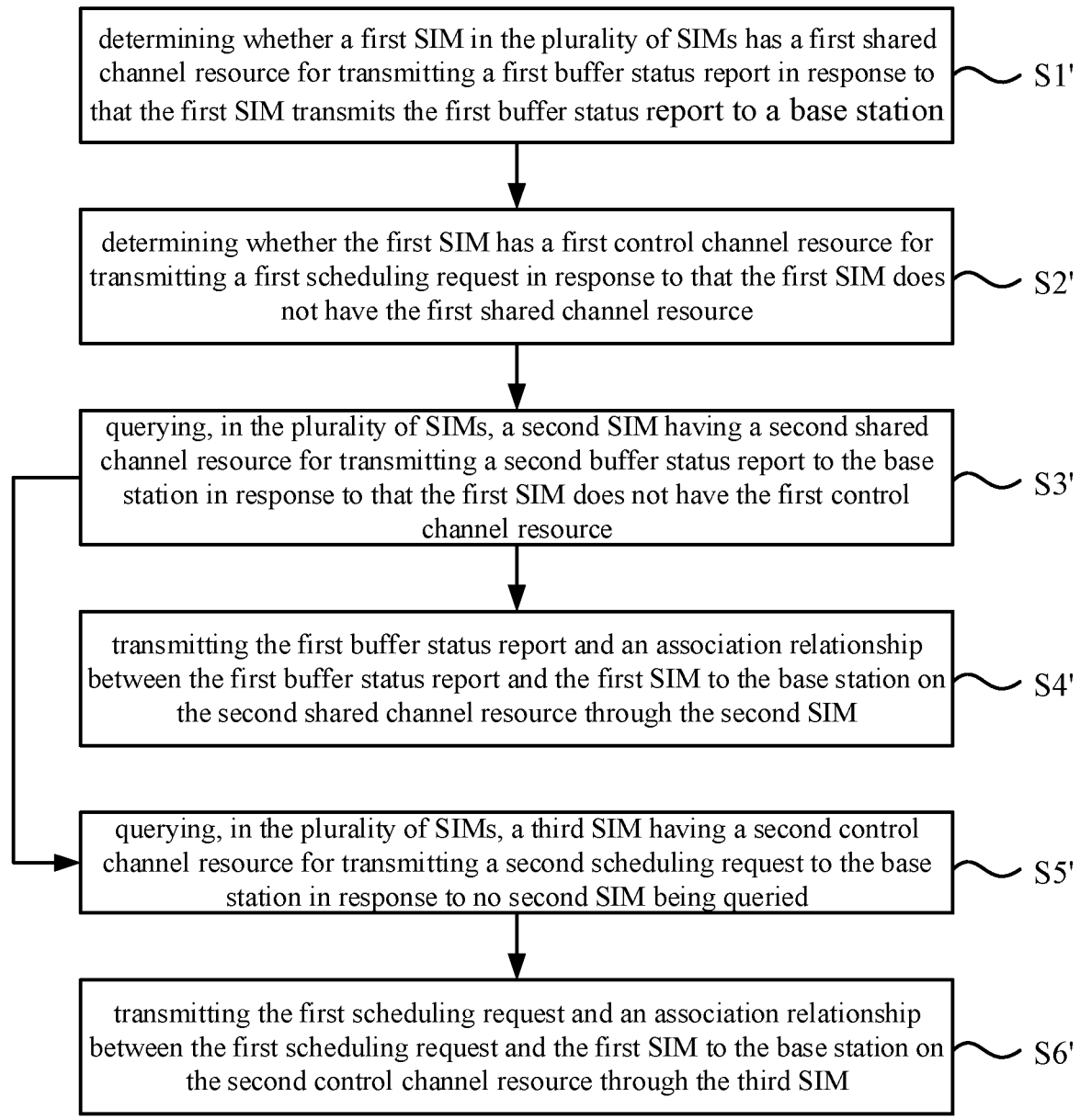
FIG. 11 is a flowchart illustrating still another method for transmitting a buffer status report according to embodiments of the disclosure.

FIG. 11 is a flowchart illustrating still another method for transmitting a buffer status report according to embodiments of the disclosure. As illustrated in FIG. 11, the method further includes the following.

In S5', a third SIM having a second control channel resource for transmitting a second scheduling request to the base station is queried in the plurality of SIMs in response to no second SIM being queried.

In S6', the first scheduling request and an association relationship between the first scheduling request and the first SIM are transmitted to the base station on the second control channel resource through the third SIM.

In one embodiment, if the second SIM is not queried, it may be determined that all SIMs in the terminal do not have PUSCH resources for transmitting the buffer status reports. The first SIM does not have the first control channel resource for transmitting the scheduling request.

Since different SIMs transmit scheduling requests to the base station respectively, different SIMs may be configured by the base station for PUCCH resources for transmitting scheduling requests. For example, when the first SIM does not have the first control channel resource for transmitting the scheduling request, other SIMs in the plurality of SIMs may have control channel resources for transmitting scheduling requests.

Therefore, when the first SIM does not have the first control channel resource, the third SIM that needs transmit the second scheduling request to the base stations on the second control channel resource may be queried in the plurality of SIMs. Furthermore, the first scheduling request and the association relationship between the first scheduling request and the first SIM are transmitted to the base station on the second control channel resource through the queried third SIM.

The base station may configure the resource for the third SIM based on the second scheduling request and determine that the first scheduling request is a scheduling request of the first SIM based on the association relationship between the first scheduling request and the first SIM. Therefore, the resource may be configured for the first SIM based on the first scheduling request.

Accordingly, when the first SIM does not have the first control channel resource, the first scheduling request that the first SIM needs to transmit may be transmitted through the third SIM with the second control channel resource, so that there is no need for the first SIM to initiate the random access to the base station, which shortens the duration for transmitting the first buffer status report to the base station and save resources for information exchange between the first SIM and the base station.

It should be noted that when the second SIM transmits the first buffer status report and the association relationship between the first scheduling request and the first SIM to the base station on the second control channel resource, if the second SIM does not need to transmit the second scheduling request, only the first scheduling request and the association relationship between the first scheduling request and the first SIM may be transmitted on the second shared channel. If the second SIM needs to transmit the second scheduling request, the first scheduling request and the association relationship between the first scheduling request and the first SIM may be transmitted on the second shared channel.

Figure 12:
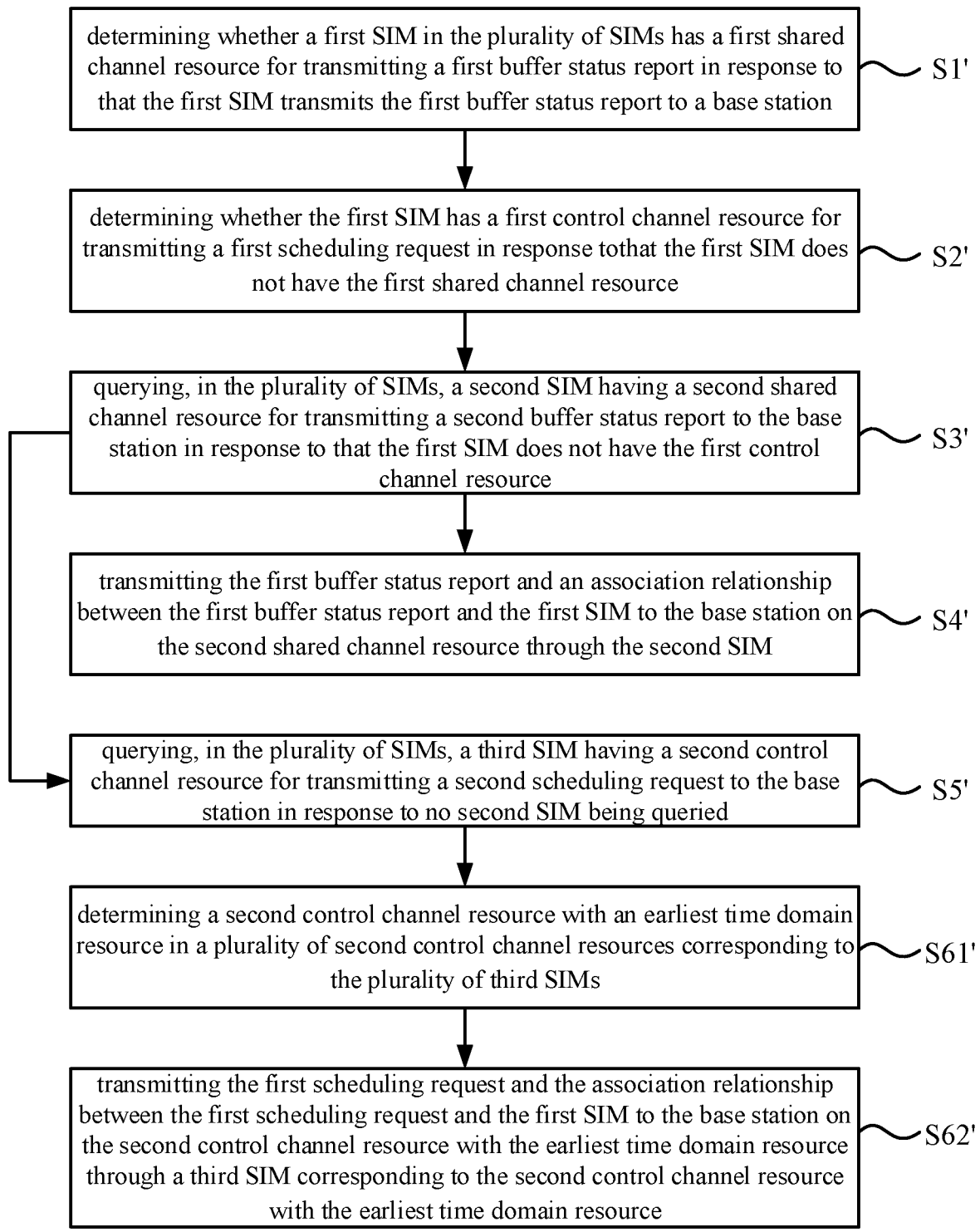
FIG. 12 is a flowchart illustrating still another method for transmitting a buffer status report according to embodiments of the disclosure.
Figure 13:
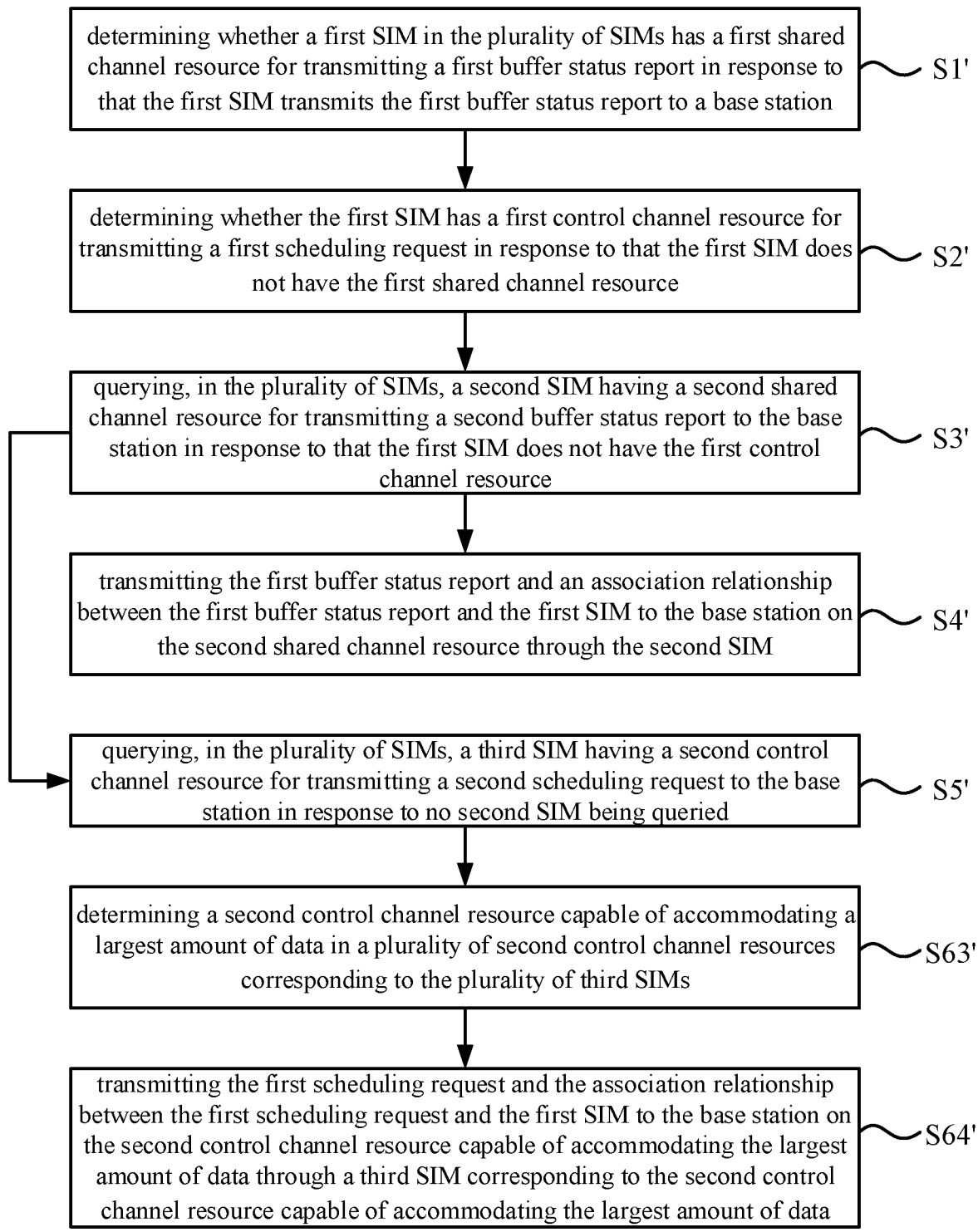
FIG. 13 is a flowchart illustrating still another method for transmitting a buffer status report according to embodiments of the disclosure.

FIG. 12 is a flowchart illustrating still another method for transmitting a buffer status report according to embodiments of the disclosure. FIG. 13 is a flowchart illustrating still another method for transmitting a buffer status report according to embodiments of the disclosure.

As illustrated in FIG. 12, in response to a plurality of third SIMs being queried, transmitting the first scheduling request and the association relationship between the first scheduling request and the first SIM to the base station on the second control channel resource through the third SIM includes the following.

In S61', a second control channel resource with an earliest time domain resource in a plurality of second control channel resources corresponding to the plurality of third SIMs is determined.

In S62', the first scheduling request and the association relationship between the first scheduling request and the first SIM are transmitted to the base station on the second control channel resource with the earliest time domain resource through a third SIM corresponding to the second control channel resource with the earliest time domain resource.

Alternatively, as illustrated in FIG. 13, in response to a plurality of third SIMs being queried, transmitting the first scheduling request and the association relationship between the first scheduling request and the first SIM to the base station on the second control channel resource through the third SIM includes the following.

In S63', a second control channel resource capable of accommodating a largest amount of data in a plurality of second control channel resources corresponding to the plurality of third SIMs is determined.

In S64', the first scheduling request and the association relationship between the first scheduling request and the first SIM are transmitted to the base station on the second control channel resource capable of accommodating the largest amount of data through a third SIM corresponding to the second control channel resource capable of accommodating the largest amount of data.

In one embodiment, when the third SIM is queried in the plurality of SIMs, the plurality of third SIMs may be queried. That is, the plurality of SIMs are queried, which need to transmit scheduling requests to the base station and have PUCCH resources for transmitting the scheduling requests.

In this case, the time domain resource in the second control channel resource of each third SIM may be determined. The third SIM corresponding to the second control channel resource with the earliest time domain resource may be determined. The first scheduling request and the association relationship between the first scheduling request and the first SIM are transmitted to the base station on the second control channel resource with the earliest time domain resource through the third SIM corresponding to the second control channel resource with the earliest time domain resource.

Accordingly, the first scheduling request may be transmitted to the base station as soon as possible, so that the base station may configure the resource for the first SIM based on the first scheduling request as soon as possible. Therefore, the terminal may complete communication with the base station through the first SIM in time.

In one embodiment, when the third SIM is queried in the plurality of SIMs, the plurality of third SIMs may be queried. That is, the plurality of SIMs are queried, which need to transmit scheduling requests to the base station and have PUCCH resources for transmitting the scheduling requests.

In this case, the amount of data accommodated by the second control channel resource of each third SIM may be determined. The third SIM corresponding to the second control channel resource capable of accommodating the largest amount of data may be determined. The first scheduling request and the association relationship between the first scheduling request and the first SIM are transmitted to the base station on the second control channel resource capable of accommodating the largest amount of data through the third SIM corresponding to the second control channel resource capable of accommodating the largest amount of data.

Since the second control channel resource configured by the base station for the third SIM is generally used to transmit the second scheduling request of the third SIM, the amount of data accommodated by the second control channel resource is generally not very large. It is possible that the first scheduling request and the association relationship between the first scheduling request and the first SIM may not be transmitted on the second control channel resource.

With the embodiments of the disclosure, the first scheduling request and the association relationship between the first scheduling request and the first SIM are transmitted to the base station on the second control channel resource capable of accommodating the largest amount of data through the third SIM corresponding to the second control channel resource capable of accommodating the largest amount of data, which ensures that the second control channel resource may accommodate the first scheduling request and the association relationship between the first scheduling request and the first SIM and ensures that the first scheduling request and the association relationship between the first scheduling request and the first SIM are transmitted to the base station at one time.

It should be noted that the embodiments illustrated in FIG. 12 and FIG. 13 may be combined. When the third SIM corresponding to the second control channel resource with the earliest time domain resource and the third SIM corresponding to the second control channel resource capable of accommodating the largest amount of data are not the same SIM, it may be determined whether the second control channel resource with the earliest time domain resource may accommodate the first scheduling request and the association relationship between the first scheduling request and the first SIM.

If yes, the first scheduling request and the association relationship between the first scheduling request and the first SIM are transmitted through the third SIM corresponding to the second control channel resource with the earliest time domain resource, to ensure that the first scheduling request and the association relationship between the first scheduling request and the first SIM may be transmitted to the base station at one time, so that the first scheduling request is transmitted to the base station as soon as possible.

If not, the first scheduling request and the association relationship between the first scheduling request and the first SIM are transmitted through the third SIM corresponding to the second control channel resource capable of accommodating the largest amount of data, to ensure that the first scheduling request and the association relationship between the first scheduling request and the first SIM may be transmitted to the base station at one time, reducing the number of communications between the terminal and the base station and saving communication resources.

Figure 14:
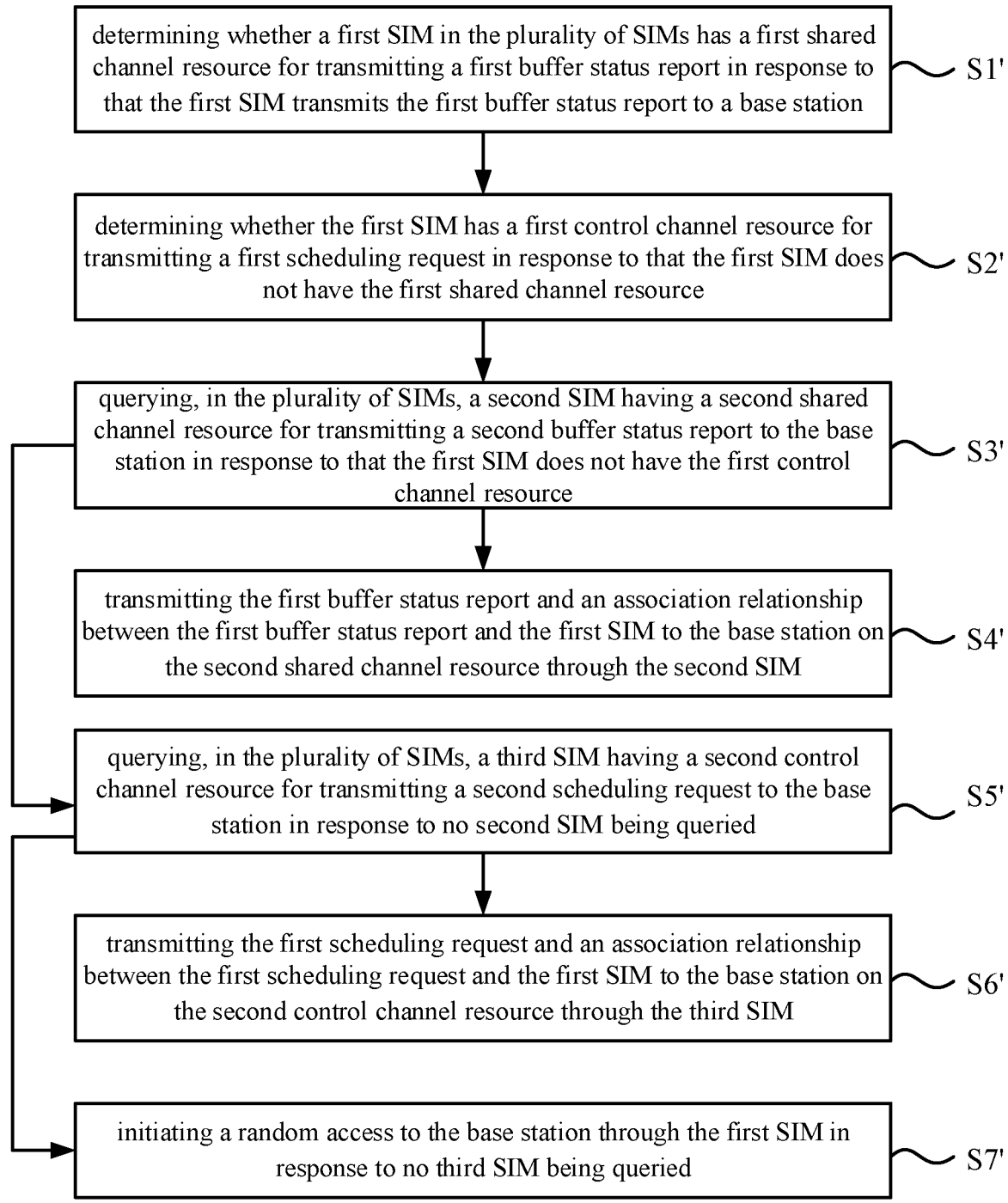
FIG. 14 is a flowchart illustrating still another method for transmitting a buffer status report according to embodiments of the disclosure.

FIG. 14 is a flowchart illustrating still another method for transmitting a buffer status report according to embodiments of the disclosure. As illustrated in FIG. 14, the method further includes the following.

In S7', a random access to the base station is initiated through the first SIM in response to no third SIM being queried.

In one embodiment, if the third SIM is not queried, it may be determined that all SIMs in the terminal do not have PUCCH resources for transmitting scheduling requests, and the random access may be initiated to the base station through the first SIM to establish the communication with the base station to complete communication.

Corresponding to the foregoing embodiments of the method for transmitting the buffer status report, the disclosure also provides embodiments of an apparatus for transmitting a buffer status report.

Figure 15:
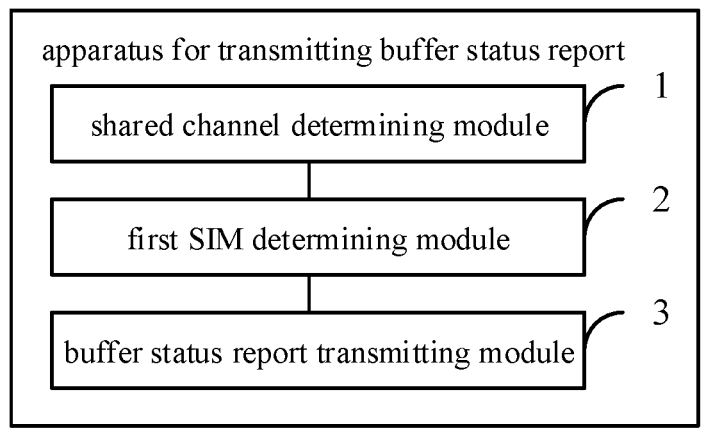
FIG. 15 is a block diagram illustrating an apparatus for transmitting a buffer status report according to embodiments of the disclosure.

FIG. 15 is a block diagram illustrating an apparatus for transmitting a buffer status report according to embodiments of the disclosure. The method illustrated in the embodiments of the disclosure may be applicable to a terminal. The terminal may communicate based on a multi-SIM single-standby (for example, dual-SIM single-standby) mode, a multi-SIM multi-standby (for example, dual-SIM dual-standby) mode or a multi-SIM multi-standby multi-pass (for example, dual-SIM dual-standby dual-pass) mode.

The terminal may be connected to at least two operator networks. For example, the terminal may be used as UE to communicate with a base station in the operator network. A plurality of SIMs may be arranged in the terminal. The SIM may be, for example a USIM. The plurality of SIMs may be connected to the same operator network, for example, the plurality of SIMs may be connected to the first operator network. In addition to the plurality of SIMs connected to the first operator network, the terminal may also be provided with a SIM connected to the second operator network. The first operator network and the second operator network are networks provided by different operators, for example, the first operator network may be China Mobile and the second operator network may be China Unicom or The following embodiments exemplarily describe the technical solutions of the disclosure for SIMs connected to the same operator network.

As illustrated in FIG. 15, the apparatus for transmitting the buffer status report is applicable to the terminal. The terminal includes a plurality of SIMs. The plurality of SIMs are configured to be connected to the same operator network. The apparatus includes a shared channel determining module 1, a first SIM determining module 2 and a buffer status report transmitting module 3.

The shared channel determining module 1 is configured to determine whether a first SIM in the plurality of SIMs has a first shared channel resource for transmitting a first buffer status report in response to that the first SIM transmits the first buffer status report to a base station.

The first SIM determining module 2 is configured to query, in the plurality of SIMs, a second SIM having a second shared channel resource for transmitting a second buffer status report to the base station in response to that the first SIM does not have the first shared channel resource.

The buffer status report transmitting module 3 is configured to transmit the first buffer status report and an association relationship between the first buffer status report and the first SIM to the base station on the second shared channel resource through the second SIM.

Figure 16:
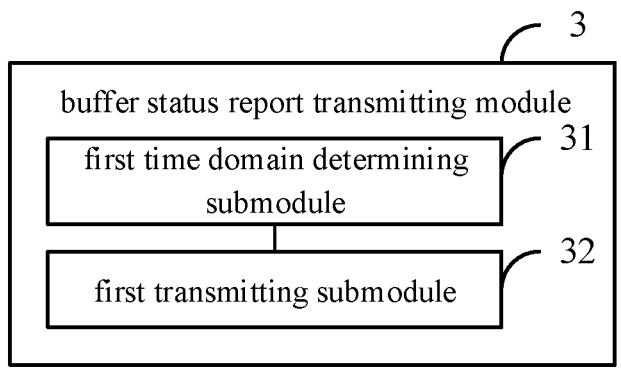
FIG. 16 is a block diagram illustrating an apparatus for transmitting a buffer status report according to embodiments of the disclosure.
Figure 17:
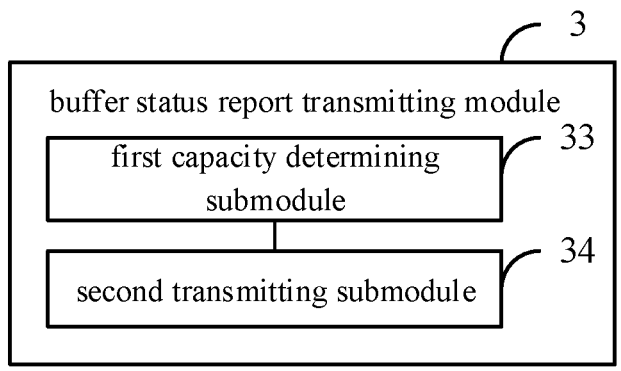
FIG. 17 is a block diagram illustrating another apparatus for transmitting a buffer status report according to embodiments of the disclosure.

FIG. 16 is a block diagram illustrating an apparatus for transmitting a buffer status report according to embodiments of the disclosure. FIG. 17 is a block diagram illustrating another apparatus for transmitting a buffer status report according to embodiments of the disclosure.

As illustrated in FIG. 16, the buffer status report transmitting module 3 includes a first time domain determining submodule 31 and a first transmitting submodule 32.

The first time domain determining submodule 31 is configured to determine a second shared channel resource with an earliest time domain resource in a plurality of second shared channel resources corresponding to the plurality of second SIMs.

The first transmitting submodule 32 is configured to transmit the first buffer status report and the association relationship between the first buffer status report and the first SIM to the base station on the second shared channel resource with the earliest time domain resource through a second SIM corresponding to the second shared channel resource with the earliest time domain resource.

Alternatively, as illustrated in FIG. 17, the buffer status report transmitting module 3 includes a first capacity determining submodule 33 and a second transmitting submodule 34.

The first capacity determining submodule 33 is configured to, determine a second shared channel resource capable of accommodating a largest amount of data in a plurality of second shared channel resources corresponding to the plurality of second SIMs.

The second transmitting submodule 34 is configured to transmit the first buffer status report and the association relationship between the first buffer status report and the first SIM to the base station on the second shared channel resource capable of accommodating the largest amount of data through a second SIM corresponding to the second shared channel resource capable of accommodating the largest amount of data.

Figure 18:
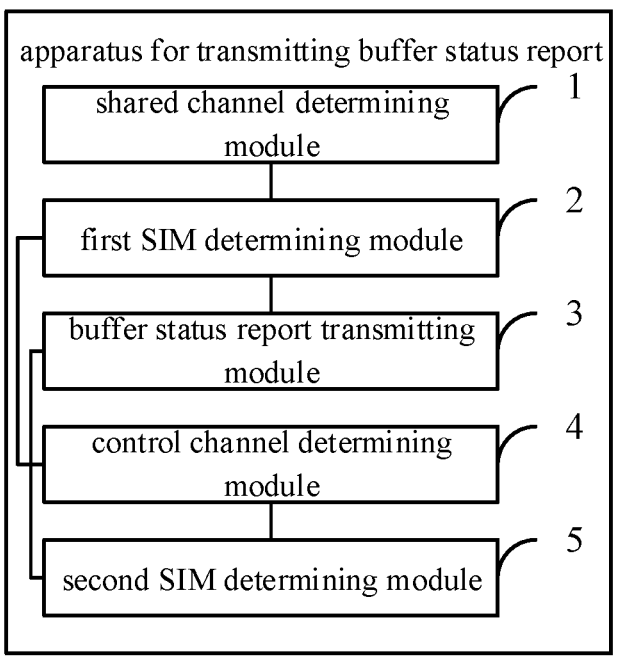
FIG. 18 is a block diagram illustrating another apparatus for transmitting a buffer status report according to embodiments of the disclosure.

FIG. 18 is a block diagram illustrating another apparatus for transmitting a buffer status report according to embodiments of the disclosure. As illustrated in FIG. 18, the apparatus further includes a control channel determining module 4 and a second SIM determining module 5.

The control channel determining module 4 is configured to determine whether the first SIM has a first control channel resource for transmitting a first scheduling request in response to no second SIM being queried.

The second SIM determining module 5 is configured to query, in the plurality of SIMs, a third SIM having a second control channel resource for transmitting a second scheduling request to the base station in response to that the first SIM does not have the first control channel resource.

The buffer status report transmitting module 3 is further configured to transmit the first scheduling request and an association relationship between the first scheduling request and the first SIM to the base station on the second control channel resource through the third SIM.

Figure 19:
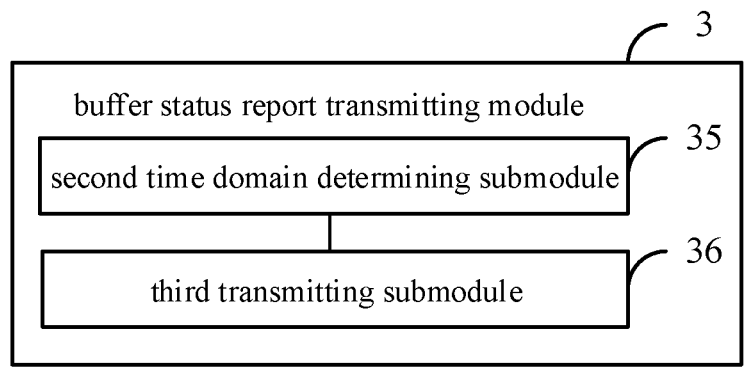
FIG. 19 is a block diagram illustrating still another apparatus for transmitting a buffer status report according to embodiments of the disclosure.
Figure 20:
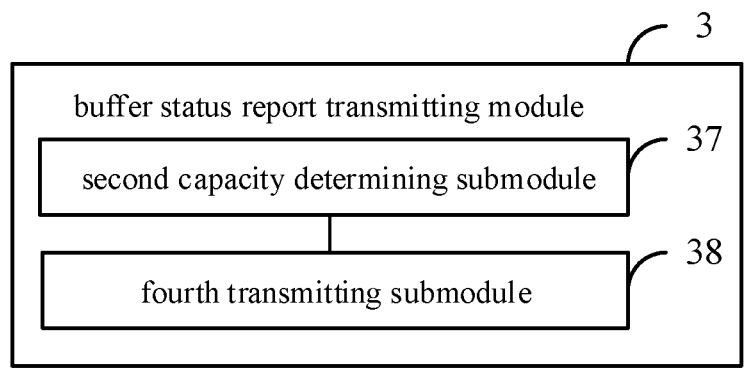
FIG. 20 is a block diagram illustrating still another apparatus for transmitting a buffer status report according to embodiments of the disclosure.

FIG. 19 is a block diagram illustrating still another apparatus for transmitting a buffer status report according to embodiments of the disclosure. FIG. 20 is a block diagram illustrating still another apparatus for transmitting a buffer status report according to embodiments of the disclosure.

As illustrated in FIG. 19, the buffer status report transmitting module 3 includes a second time domain determining submodule 35 and a third transmitting submodule 36.

The second time domain determining submodule 35 is configured to determine a second control channel resource with an earliest time domain resource in a plurality of second control channel resources corresponding to the plurality of third SIMs.

The third transmitting submodule 36 is configured to transmit the first scheduling request and the association relationship between the first scheduling request and the first SIM to the base station on the second control channel resource with the earliest time domain resource through a third SIM corresponding to the second control channel resource with the earliest time domain resource.

Alternatively, as illustrated in FIG. 20, the buffer status report transmitting module 3 includes a second capacity determining submodule 37 and a fourth transmitting submodule 38.

The second capacity determining submodule 37 is configured to determine a second control channel resource capable of accommodating a largest amount of data in a plurality of second control channel resources corresponding to the plurality of third SIMs.

The fourth transmitting submodule 38 is configured to transmit the first scheduling request and the association relationship between the first scheduling request and the first SIM to the base station on the second control channel resource capable of accommodating the largest amount of data through a third SIM corresponding to the second control channel resource capable of accommodating the largest amount of data.

Figure 21:
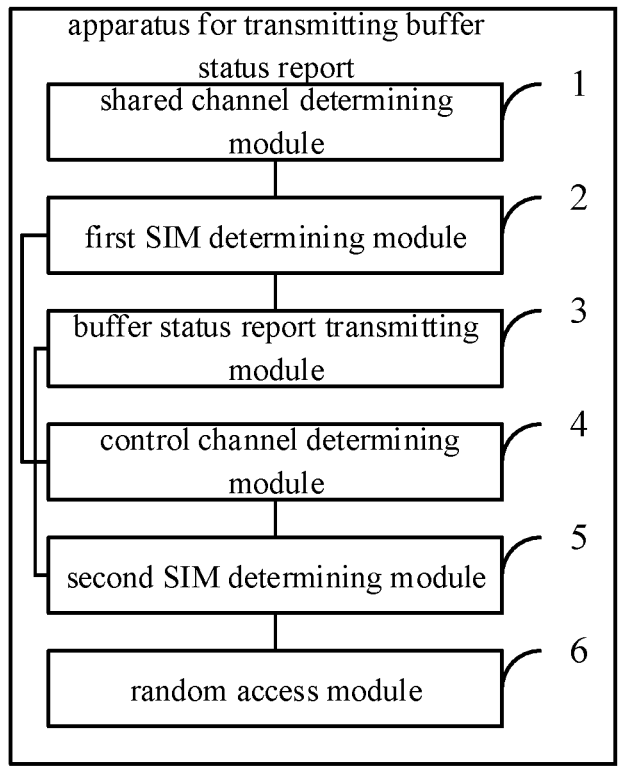
FIG. 21 is a block diagram illustrating still another apparatus for transmitting a buffer status report according to embodiments of the disclosure.

FIG. 21 is a block diagram illustrating still another apparatus for transmitting a buffer status report according to embodiments of the disclosure. As illustrated in FIG. 21, the apparatus further includes a random access module 6.

The random access module 6 is configured to initiate a random access to the base station through the first SIM in response to no third SIM being queried.

Figure 22:
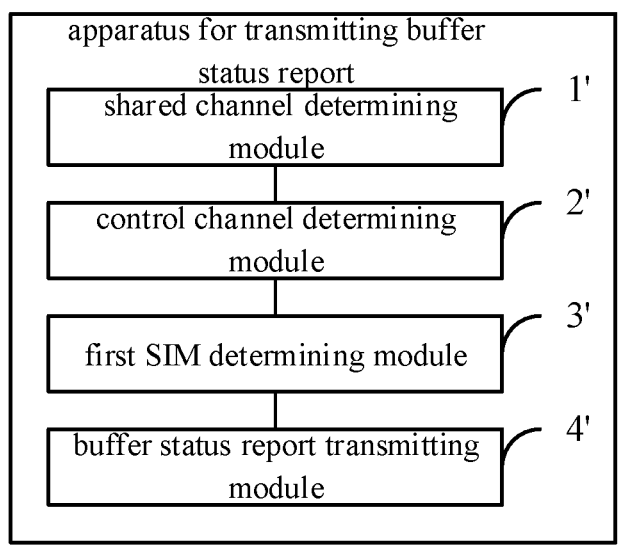
FIG. 22 is a block diagram illustrating an apparatus for transmitting a buffer status report according to embodiments of the disclosure.

FIG. 22 is a block diagram illustrating an apparatus for transmitting a buffer status report according to embodiments of the disclosure. The method illustrated in the embodiments of the disclosure may be applicable to a terminal. The terminal may communicate based on a multi-SIM single-standby (for example, dual-SIM single-standby) mode, a multi-SIM multi-standby (for example, dual-SIM dual-standby) mode or a multi-SIM multi-standby multi-pass (for example, dual-SIM dual-standby dual-pass) mode.

The terminal may be connected to at least two operator networks. For example, the terminal may be used as UE to communicate with a base station in the operator network. A plurality of SIMs may be arranged in the terminal. The SIM may be, for example a USIM. The plurality of SIMs may be connected to the same operator network, for example, the plurality of SIMs may be connected to the first operator network. In addition to the plurality of SIMs connected to the first operator network, the terminal may also be provided with a SIM connected to the second operator network. The first operator network and the second operator network are networks provided by different operators, for example, the first operator network may be China Mobile and the second operator network may be China Unicom or China Telecom.

The following embodiments exemplarily describe the technical solutions of the disclosure for SIMs connected to the same operator network.

As illustrated in FIG. 22, the apparatus for transmitting the buffer status report is applicable to the terminal. The terminal includes a plurality of SIMs. The plurality of SIMs are configured to be connected to the same operator network. The apparatus includes a shared channel determining module 1', a control channel determining module 2', a first SIM determining module 3' and a buffer status report transmitting module 4'.

The shared channel determining module 1' is configured to determine whether a first SIM in the plurality of SIMs has a first shared channel resource for transmitting a first buffer status report in response to that the first SIM transmits the first buffer status report to a base station.

The control channel determining module 2' is configured to determine whether the first SIM has a first control channel resource for transmitting a first scheduling request in response to that the first SIM does not have the first shared channel resource.

The first SIM determining module 3' is configured to query, in the plurality of SIMs, a second SIM having a second shared channel resource for transmitting a second buffer status report to the base station in response to that the first SIM does not have the first control channel resource.

The buffer status report transmitting module 4' is configured to transmit the first buffer status report and an association relationship between the first buffer status report and the first SIM to the base station on the second shared channel resource through the second SIM.

Figure 23:
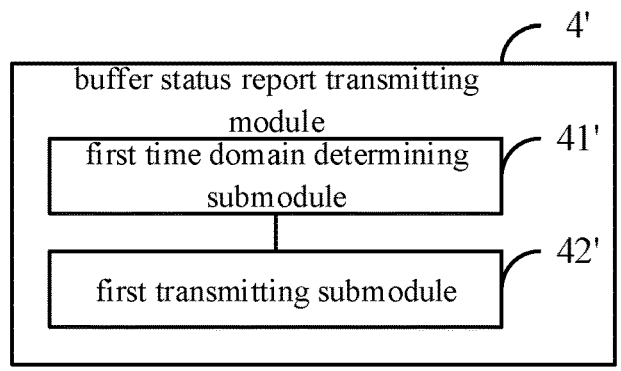
FIG. 23 is a block diagram illustrating an apparatus for transmitting a buffer status report according to embodiments of the disclosure.
Figure 24:
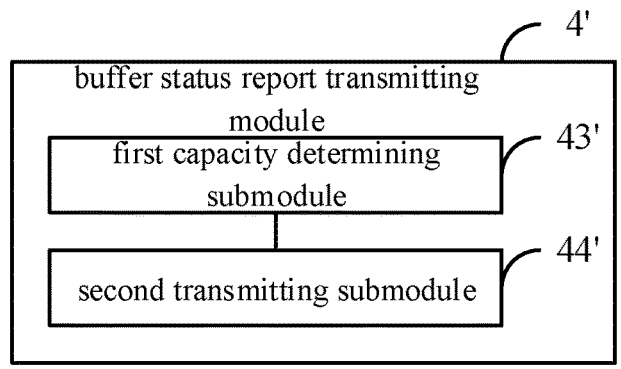
FIG. 24 is a block diagram illustrating another apparatus for transmitting a buffer status report according to embodiments of the disclosure.

FIG. 23 is a block diagram illustrating an apparatus for transmitting a buffer status report according to embodiments of the disclosure. FIG. 24 is a block diagram illustrating another apparatus for transmitting a buffer status report according to embodiments of the disclosure.

As illustrated in FIG. 23, the buffer status report transmitting module 4' includes a first time domain determining submodule 41' and a first transmitting submodule 42'.

The first time domain determining submodule 41' is configured to determine a second shared channel resource with an earliest time domain resource in a plurality of second shared channel resources corresponding to the plurality of second SIMs.

The first transmitting submodule 42' is configured to transmit the first buffer status report and the association relationship between the first buffer status report and the first SIM to the base station on the second shared channel resource with the earliest time domain resource through a second SIM corresponding to the second shared channel resource with the earliest time domain resource.

Alternatively, as illustrated in FIG. 24, the buffer status report transmitting module 4' includes a first capacity determining submodule 43' and a second transmitting submodule 44'.

The first capacity determining submodule 43' is configured to, determine a second shared channel resource capable of accommodating a largest amount of data in a plurality of second shared channel resources corresponding to the plurality of second SIMs.

The second transmitting submodule 44' is configured to transmit the first buffer status report and the association relationship between the first buffer status report and the first SIM to the base station on the second shared channel resource capable of accommodating the largest amount of data through a second SIM corresponding to the second shared channel resource capable of accommodating the largest amount of data.

Figure 25:
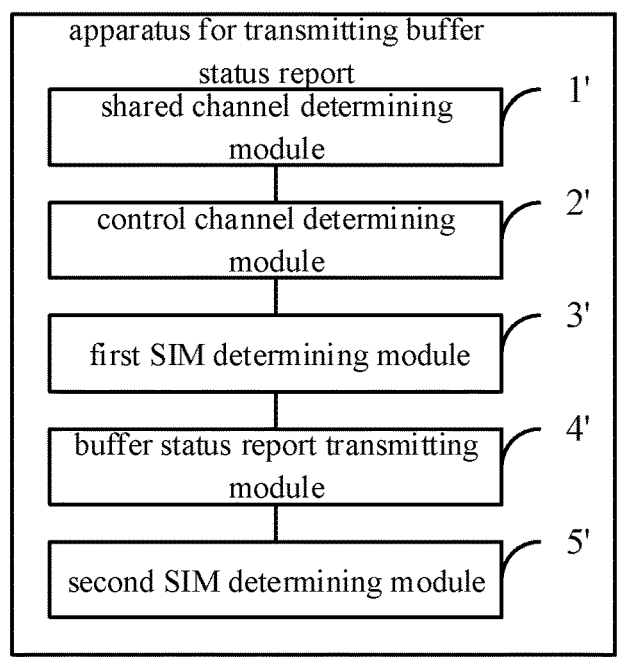
FIG. 25 is a block diagram illustrating another apparatus for transmitting a buffer status report according to embodiments of the disclosure.

FIG. 25 is a block diagram illustrating another apparatus for transmitting a buffer status report according to embodiments of the disclosure. As illustrated in FIG. 25, the apparatus further includes a second SIM determining module 5'.

The second SIM determining module 5' is configured to query, in the plurality of SIMs, a third SIM having a second control channel resource for transmitting a second scheduling request to the base station in response to no second SIM being queried.

The buffer status report transmitting module 6' is further configured to transmit the first scheduling request and an association relationship between the first scheduling request and the first SIM to the base station on the second control channel resource through the third SIM.

Figure 26:
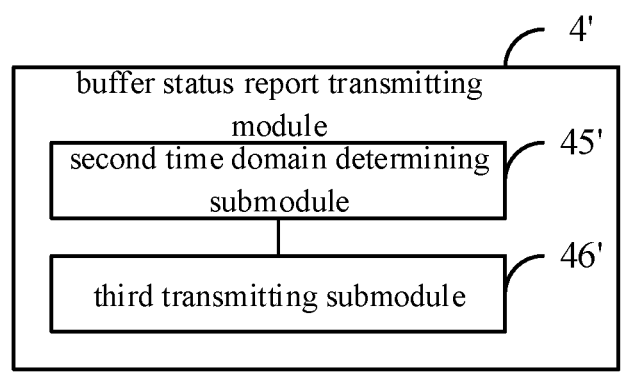
FIG. 26 is a block diagram illustrating still another apparatus for transmitting a buffer status report according to embodiments of the disclosure.
Figure 27:
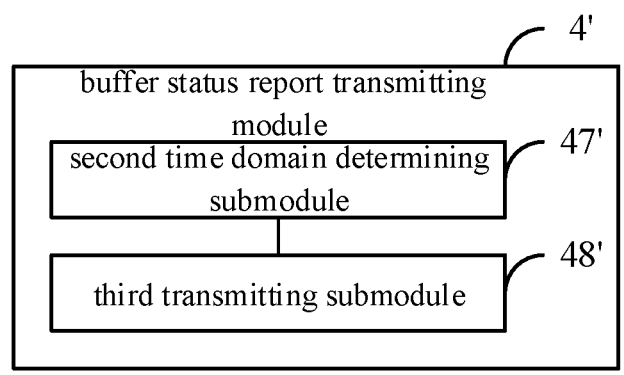
FIG. 27 is a block diagram illustrating still another apparatus for transmitting a buffer status report according to embodiments of the disclosure.

FIG. 26 is a block diagram illustrating still another apparatus for transmitting a buffer status report according to embodiments of the disclosure. FIG. 27 is a block diagram illustrating still another apparatus for transmitting a buffer status report according to embodiments of the disclosure.

As illustrated in FIG. 26, the buffer status report transmitting module 4' includes a second time domain determining submodule 45' and a third transmitting submodule 46'.

The second time domain determining submodule 45' is configured to determine a second control channel resource with an earliest time domain resource in a plurality of second control channel resources corresponding to the plurality of third SIMs.

The third transmitting submodule 46' is configured to transmit the first scheduling request and the association relationship between the first scheduling request and the first SIM to the base station on the second control channel resource with the earliest time domain resource through a third SIM corresponding to the second control channel resource with the earliest time domain resource.

As illustrated in FIG. 27, the buffer status report transmitting module 4' includes a second capacity determining submodule 47' and a fourth transmitting submodule 48'.

The second capacity determining submodule 47' is configured to determine a second control channel resource capable of accommodating a largest amount of data in a plurality of second control channel resources corresponding to the plurality of third SIMs.

The fourth transmitting submodule 48' is configured to transmit the first scheduling request and the association relationship between the first scheduling request and the first SIM to the base station on the second control channel resource capable of accommodating the largest amount of data through a third SIM corresponding to the second control channel resource capable of accommodating the largest amount of data.

Figure 28:
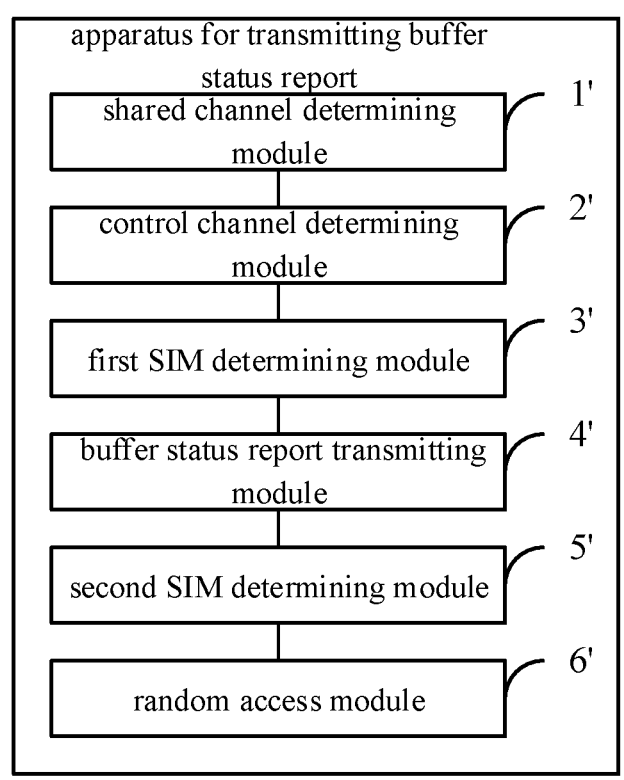
FIG. 28 is a block diagram illustrating still another apparatus for transmitting a buffer status report according to embodiments of the disclosure.

FIG. 28 is a block diagram illustrating still another apparatus for transmitting a buffer status report according to embodiments of the disclosure. As illustrated in FIG. 28, the apparatus further includes a random access module 6'.

The random access module 6' is configured to initiate a random access to the base station through the first SIM in response to no third SIM being queried.

With respect to the apparatuses in the above embodiments, the specific manners for performing operations for individual modules therein have been described in detail in the embodiments regarding the methods, which will not be elaborated herein With respect to the apparatus embodiments, since they basically correspond to the method embodiments and the reference should be made to the relevant part of the description of the method embodiments. The apparatus embodiments described above are merely illustrative. The modules described as separate components may or may not be physically separated and the components displayed as modules may or may not be physical modules. That is, they may be located in one place or distributed to plurality of network modules. Some or all of the modules may be selected according to actual needs to achieve the objectives of the solutions of the embodiments. Those of ordinary skill in the art may understand and implement it without creative work.

The embodiments of the disclosure also propose an electronic device.

The electronic device includes a processor.

The electronic device further includes a memory for storing instructions executable by the processor.

The processor is configured to perform the method for transmitting the buffer status report according to any embodiment as described in FIG. 1 to FIG. 7.

The embodiments of the disclosure also propose an electronic device.

The electronic device includes a processor.

The electronic device further includes a memory for storing instructions executable by the processor.

The processor is configured to perform the method for transmitting the buffer status report according to any embodiment as described in FIG. 8 to FIG. 14.

The embodiments of the disclosure also propose a computer-readable storage medium. The computer-readable storage medium has stored therein a computer program. The computer program is executed by a processor to perform the method for transmitting the buffer status report according to any embodiment as described in FIG. 1 to FIG. 7.

Some embodiments of the disclosure also disclose a computer-readable storage medium. The computer-readable storage medium has stored therein a computer program. The computer program is executed by a processor to perform the method for transmitting the buffer status report according to any embodiment as described in FIG. 8 to FIG. 14.

Figure 29:
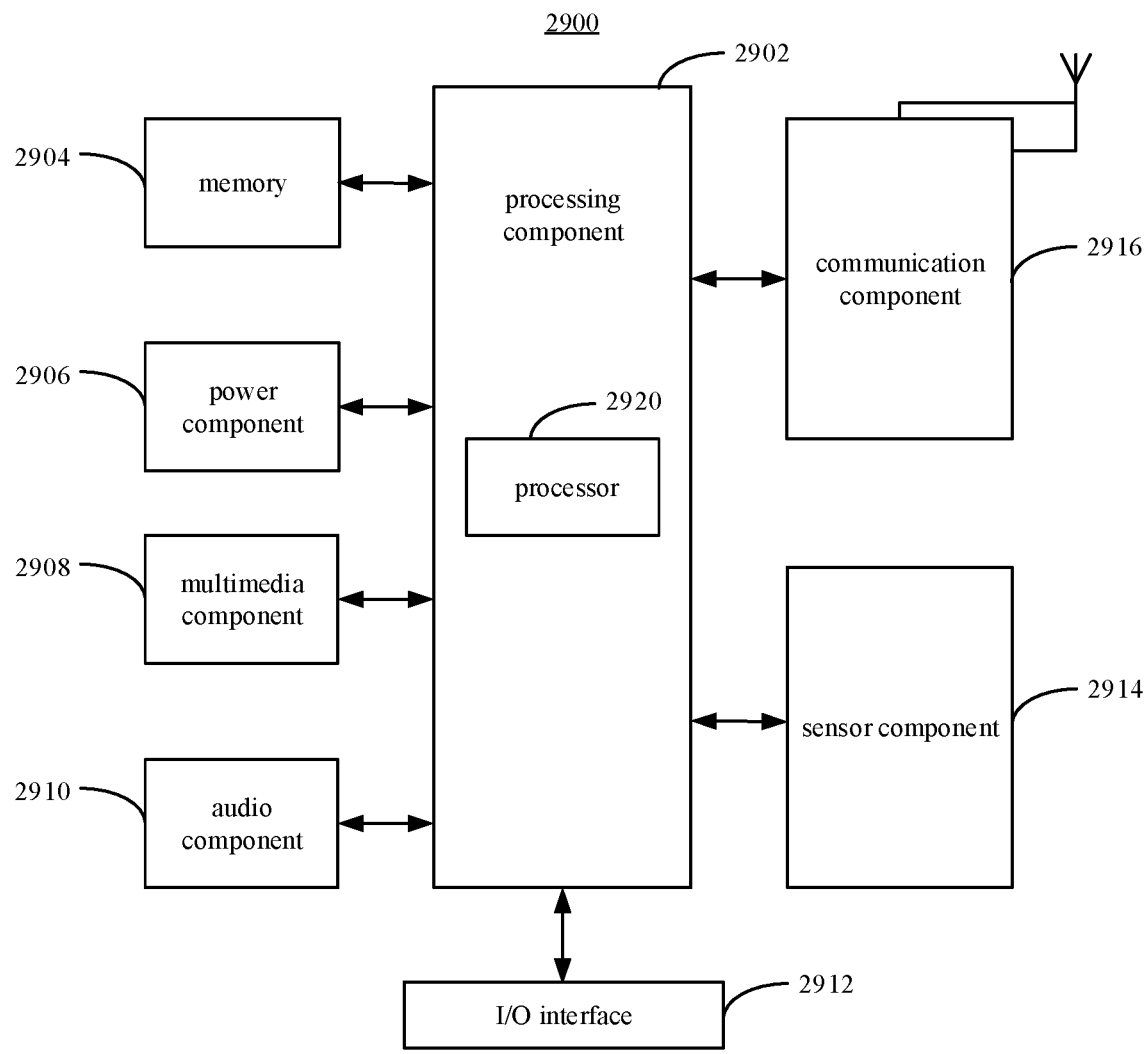
FIG. 29 is a block diagram illustrating a device for transmitting a buffer status report according to embodiment of the disclosures.

FIG. 29 is a block diagram illustrating a device for transmitting a buffer status report according to embodiment of the disclosures. For example, the device 2900 may be a mobile phone, a computer, a digital broadcast terminal, a messaging device, a gaming console, a tablet, a medical device, exercise equipment, a personal digital assistant, and the like.

Referring to FIG. 29, the device 2900 may include one or more of the following components: a processing component 2902, a memory 2904, a power component 2906, a multimedia component 2908, an audio component 2910, an input/output (I/O) interface 2912, a sensor component 2914, and a communication component 2916.

The processing component 2902 typically controls overall operations of the device 2900, such as the operations associated with display, telephone calls, data communications, camera operations, and recording operations. The processing component 2902 may include one or more processors 2920 to execute instructions to perform all or part of the actions in the above described methods. Moreover, the processing component 2902 may include one or more modules which facilitate the interaction between the processing component 2902 and other components. For instance, the processing component 2902 may include a multimedia module to facilitate the interaction between the multimedia component 2908 and the processing component 2902.

The memory 2904 is configured to store various types of data to support the operation of the device 2900. Examples of such data include instructions for any applications or methods operated on the device 2900, contact data, phonebook data, messages, pictures, video, etc. The memory 2904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2906 provides power to various components of the device 2900. The power component 2906 may include a power management system, one or more power sources, and any other components associated with the generation, management, and distribution of power in the device 2900.

The multimedia component 2908 includes a screen providing an output interface between the device 2900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2908 includes a front camera and/or a rear camera. The front camera and the rear camera may receive an external multimedia datum while the device 2900 is in an operation mode, such as a photographing mode or a video mode. Each of the front camera and the rear camera may be a fixed optical lens system or have focus and optical zoom capability.

The audio component 2910 is configured to output and/or input audio signals. For example, the audio component 2910 includes a microphone ("MIC") configured to receive an external audio signal when the device 2900 is in an operation mode, such as a call mode, a recording mode, and a voice recognition mode. The received audio signal may be further stored in the memory 2904 or transmitted via the communication component 2916. In some embodiments, the audio component 2910 further includes a speaker to output audio signals.

The I/O interface 2912 provides an interface between the processing component 2902 and peripheral interface modules, such as a keyboard, a click wheel, buttons, and the like. The buttons may include, but are not limited to, a home button, a volume button, a starting button, and a locking button.

The sensor component 2914 includes one or more sensors to provide status assessments of various aspects of the device 2900. For instance, the sensor component 2914 may detect an open/closed status of the device 2900, relative positioning of components, e.g., the display and the keypad, of the device 2900, a change in position of the device 2900 or a component of the device 2900, a presence or absence of user contact with the device 2900, an orientation or an acceleration/deceleration of the device 2900, and a change in temperature of the device 2900. The sensor component 2914 may include a proximity sensor configured to detect the presence of nearby objects without any physical contact. The sensor component 2914 may also include a light sensor, such as a CMOS or CCD image sensor, for use in imaging applications. In some embodiments, the sensor component 2914 may also include an accelerometer sensor, a gyroscope sensor, a magnetic sensor, a pressure sensor, or a temperature sensor.

The communication component 2916 is s configured to facilitate communication, wired or wirelessly, between the device 2900 and other devices. The device 2900 can access a wireless network based on a communication standard, such as wireless fidelity (WiFi), 2-generation wireless telephone technology (2G), 3-generation wireless telephone technology (3G), 4-generation wireless telephone technology (4G) Long Term Evolution (LET) or 5-generation wireless telephone technology (5G) New Radio (NR) or a combination thereof. In one exemplary embodiment, the communication component 2916 receives a broadcast signal or broadcast associated information from an external broadcast management system via a broadcast channel. In one exemplary embodiment, the communication component 2916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 2900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods in any embodiment in FIGS. 1 to 7 or FIGS. 8 to 14.

In exemplary embodiments, there is also provided a non-transitory computer-readable storage medium including instructions, such as included in the memory 2904, executable by the processor 2920 in the device 2900, for performing the above-described methods. For example, the non-transitory computer-readable storage medium may be a ROM, a RAM, a CD-ROM, a magnetic tape, a floppy disc, an optical data storage device, and the like.

In some embodiments of the disclosure, when the first SIM does not have the first shared channel resource, the second SIM, which needs to transmit the second buffer status report to the base station and has the second shared channel resource for transmitting the second buffer status report, is queried in the plurality of SIMs. The first buffer status report and the association relationship between the first buffer status report and the first SIM are transmitted to the base station on the second shared channel resource through the second SIM.

The base station may determine that the first buffer status report is a buffer status report of the first SIM based on the association relationship between the first buffer status report and the first SIM, and further configure the resource for the first SIM based on the first buffer status report.

Accordingly, when the first SIM does not have the first shared channel resource, the first buffer status report that the first SIM needs to transmit may be transmitted through the second SIM having the second shared channel resource, such that there is no need for the first SIM to transmit the scheduling request to the base station and further no need for the first SIM to initiate the random access, which shortens the duration for transmitting the first buffer status report to the base station and saves resources for information exchange between the first SIM and the base station.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

It should be noted that in the disclosure, relational terms such as first and second are only used to distinguish one entity or operation from another entity or operation, and do not necessarily require or imply any such actual relationship or order between these entities or operations. The terms "comprise", "include" or any other variants thereof are intended to cover non-exclusive inclusion, so that a process, method, article or device including a series of elements not only includes those elements, but also includes other elements not explicitly listed elements, or also include elements inherent to such process, method, article or device. If there are no more restrictions, the element defined by the sentence "including a . . . " does not exclude the existence of other same elements in the process, method, article or device including the element.

The methods and apparatuses provided by the embodiments of the disclosure are described in detail above. Specific examples are used in the disclosure to illustrate the principles and implementations of the disclosure. The description of the above embodiments is only used to help understand the methods and core ideas of the methods. At the same time, for those of ordinary skill in the art, there will be changes in the specific implementation and scope of the disclosure according to the ideas of the disclosure. In summary, the content of the description should not be construed as limiting the disclosure.

The invention claimed is:

1. A method for transmitting a buffer status report, applied to a terminal comprising a plurality of subscriber identification modules (SIMs) for connecting to a same operator network, comprising:
   determining whether a first SIM in the plurality of SIMs has a first shared channel resource for transmitting a first buffer status report in response to that the first SIM transmits the first buffer status report to a base station;
   querying, in the plurality of SIMs, a second SIM having a second shared channel resource for transmitting a second buffer status report to the base station in response to that the first SIM does not have the first shared channel resource; and
   transmitting the first buffer status report and an association relationship between the first buffer status report and the first SIM to the base station on the second shared channel resource through the second SIM.

2. The method as claimed in claim 1, wherein in response to a plurality of second SIMs being queried, transmitting the first buffer status report and the association relationship between the first buffer status report and the first SIM to the base station on the second shared channel resource through the second SIM comprises:
   determining a second shared channel resource with an earliest time domain resource in a plurality of second shared channel resources corresponding to the plurality of second SIMs; and
   transmitting the first buffer status report and the association relationship between the first buffer status report and the first SIM to the base station on the second shared channel resource with the earliest time domain resource through a second SIM corresponding to the second shared channel resource with the earliest time domain resource;

or, determining a second shared channel resource capable of accommodating a largest amount of data in a plurality of second shared channel resources corresponding to the plurality of second SIMs; and transmitting the first buffer status report and the association relationship between the first buffer status report and the first SIM to the base station on the second shared channel resource capable of accommodating the largest amount of data through a second SIM corresponding to the second shared channel resource capable of accommodating the largest amount of data.

3. The method as claimed in claim 1, further comprising:

determining whether the first SIM has a first control channel resource for transmitting a first scheduling request in response to no second SIM being queried;

querying, in the plurality of SIMs, a third SIM having a second control channel resource for transmitting a second scheduling request to the base station in response to that the first SIM does not have the first control channel resource; and transmitting the first scheduling request and an association relationship between the first scheduling request and the first SIM to the base station on the second control channel resource through the third SIM.

4. The method as claimed in claim 3, wherein in response to a plurality of third SIMs being queried, transmitting the first scheduling request and the association relationship between the first scheduling request and the first SIM to the base station on the second control channel resource through the third SIM comprises:

determining a second control channel resource with an earliest time domain resource in a plurality of second control channel resources corresponding to the plurality of third SIMs; and transmitting the first scheduling request and the association relationship between the first scheduling request and the first SIM to the base station on the second control channel resource with the earliest time domain resource through a third SIM corresponding to the second control channel resource with the earliest time domain resource;

or, determining a second control channel resource capable of accommodating a largest amount of data in a plurality of second control channel resources corresponding to the plurality of third SIMs; and transmitting the first scheduling request and the association relationship between the first scheduling request and the first SIM to the base station on the second control channel resource capable of accommodating the largest amount of data through a third SIM corresponding to the second control channel resource capable of accommodating the largest amount of data.

5. The method as claimed in claim 3, further comprising:

initiating a random access to the base station through the first SIM in response to no third SIM being queried.

6. A non-transitory computer-readable storage medium having stored therein a computer program that, when executed by a processor, perform actions in the method for transmitting the buffer status report as claimed in claim 1.

7. A method for transmitting a buffer status report, applied to a terminal comprising a plurality of subscriber identification modules (SIMs) for connecting to a same operator network, comprising:

determining whether a first SIM in the plurality of SIMs has a first shared channel resource for transmitting a first buffer status report in response to that the first SIM transmits the first buffer status report to a base station;

determining whether the first SIM has a first control channel resource for transmitting a first scheduling request in response to that the first SIM does not have the first shared channel resource;

querying, in the plurality of SIMs, a second SIM having a second shared channel resource for transmitting a second buffer status report to the base station in response to that the first SIM does not have the first control channel resource; and transmitting the first buffer status report and an association relationship between the first buffer status report and the first SIM to the base station on the second shared channel resource through the second SIM.

8. The method as claimed in claim 7, wherein in response to a plurality of second SIMs being queried, transmitting the first buffer status report and the association relationship between the first buffer status report and the first SIM to the base station on the second shared channel resource through the second SIM comprises:

determining a second shared channel resource with an earliest time domain resource in a plurality of second shared channel resources corresponding to the plurality of second SIMs; and transmitting the first buffer status report and the association relationship between the first buffer status report and the first SIM to the base station on the second shared channel resource with the earliest time domain resource through a second SIM corresponding to the second shared channel resource with the earliest time domain resource;

or, determining a second shared channel resource capable of accommodating a largest amount of data in a plurality of second shared channel resources corresponding to the plurality of second SIMs; and transmitting the first buffer status report and the association relationship between the first buffer status report and the first SIM to the base station on the second shared channel resource capable of accommodating the largest amount of data through a second SIM corresponding to the second shared channel resource capable of accommodating the largest amount of data.

9. The method as claimed in claim 7, further comprising:

querying, in the plurality of SIMs, a third SIM having a second control channel resource for transmitting a second scheduling request to the base station in response to no second SIM being queried; and transmitting the first scheduling request and an association relationship between the first scheduling request and the first SIM to the base station on the second control channel resource through the third SIM.

10. The method as claimed in claim 9, wherein in response to a plurality of third SIMs being queried, transmitting the first scheduling request and the association relationship between the first scheduling request and the first SIM to the base station on the second control channel resource through the third SIM comprises:

determining a second control channel resource with an earliest time domain resource in a plurality of second control channel resources corresponding to the plurality of third SIMs; and transmitting the first scheduling request and the association relationship between the first scheduling request and the first SIM to the base station on the second control channel resource with the earliest time domain resource through a third SIM corresponding to the second control channel resource with the earliest time domain resource;

or, determining a second control channel resource capable of accommodating a largest amount of data in a plurality of second control channel resources corresponding to the plurality of third SIMs; and transmitting the first scheduling request and the association relationship between the first scheduling request and the first SIM to the base station on the second control channel resource capable of accommodating the largest amount of data through a third SIM corresponding to the second control channel resource capable of accommodating the largest amount of data.

11. The method as claimed in claim 9, further comprising:
initiating a random access to the base station through the first SIM in response to no third SIM being queried.

12. An electronic device, comprising:
a processor;
a memory for storing instructions executable by the processor; and
a plurality of subscriber identification modules (SIMs) for connecting to a same operator network,
wherein, the processor is configured to perform the method for transmitting the buffer status report as claimed in claim 7.

13. The electronic device as claimed in claim 12, wherein the processor is configured to, in response to a plurality of second SIMs being queried,
determine a second shared channel resource with an earliest time domain resource in a plurality of second shared channel resources corresponding to the plurality of second SIMs; and
transmit the first buffer status report and the association relationship between the first buffer status report and the first SIM to the base station on the second shared channel resource with the earliest time domain resource through a second SIM corresponding to the second shared channel resource with the earliest time domain resource;
or,
determine a second shared channel resource capable of accommodating a largest amount of data in a plurality of second shared channel resources corresponding to the plurality of second SIMs; and
transmit the first buffer status report and the association relationship between the first buffer status report and the first SIM to the base station on the second shared channel resource capable of accommodating the largest amount of data through a second SIM corresponding to the second shared channel resource capable of accommodating the largest amount of data.

14. The electronic device as claimed in claim 12, wherein the processor is configured to,
query, in the plurality of SIMs, a third SIM having a second control channel resource for transmitting a second scheduling request to the base station in response to no second SIM being queried; and transmit the first scheduling request and an association relationship between the first scheduling request and the first SIM to the base station on the second control channel resource through the third SIM.

15. A non-transitory computer-readable storage medium having stored therein a computer program that, when executed by a processor, perform actions in the method for transmitting the buffer status report as claimed in claim 7.

16. An electronic device, comprising:
a processor;
a memory for storing instructions executable by the processor; and
a plurality of subscriber identification modules (SIMs) for connecting to a same operator network,
wherein, the processor is configured to:
determine whether a first SIM in the plurality of SIMs has a first shared channel resource for transmitting a first buffer status report in response to that the first SIM transmits the first buffer status report to a base station;
query, in the plurality of SIMs, a second SIM having a second shared channel resource for transmitting a second buffer status report to the base station in response to the first SIM not having the first shared channel resource; and
transmit the first buffer status report and an association relationship between the first buffer status report and the first SIM to the base station on the second shared channel resource through the second SIM.

17. The electronic device as claimed in claim 16, wherein the processor is configured to, in response to a plurality of second SIMs being queried,
determine a second shared channel resource with an earliest time domain resource in a plurality of second shared channel resources corresponding to the plurality of second SIMs; and
transmit the first buffer status report and the association relationship between the first buffer status report and the first SIM to the base station on the second shared channel resource with the earliest time domain resource through a second SIM corresponding to the second shared channel resource with the earliest time domain resource;
or,
determine a second shared channel resource capable of accommodating a largest amount of data in a plurality of second shared channel resources corresponding to the plurality of second SIMs; and
transmit the first buffer status report and the association relationship between the first buffer status report and the first SIM to the base station on the second shared channel resource capable of accommodating the largest amount of data through a second SIM corresponding to the second shared channel resource capable of accommodating the largest amount of data.

18. The electronic device as claimed in claim 16, wherein the processor is configured to,
determine whether the first SIM has a first control channel resource for transmitting a first scheduling request in response to no second SIM being queried;
query, in the plurality of SIMs, a third SIM having a second control channel resource for transmitting a second scheduling request to the base station in response to the first SIM not having the first control channel resource; and
transmit the first scheduling request and an association relationship between the first scheduling request and the first SIM to the base station on the second control channel resource through the third SIM.

19. The electronic device as claimed in claim 18, wherein the processor is configured to, in response to a plurality of second SIMs being queried, determine a second control channel resource with an earliest time domain resource in a plurality of second control channel resources corresponding to the plurality of third SIMs; and transmit the first scheduling request and the association relationship between the first scheduling request and the first SIM to the base station on the second control channel resource with the earliest time domain resource through a third SIM corresponding to the second control channel resource with the earliest time domain resource;

or, determine a second control channel resource capable of accommodating a largest amount of data in a plurality of second control channel resources corresponding to the plurality of third SIMs; and transmit the first scheduling request and the association relationship between the first scheduling request and the first SIM to the base station on the second control channel resource capable of accommodating the largest amount of data through a third SIM corresponding to the second control channel resource capable of accommodating the largest amount of data.

20. The electronic device as claimed in claim 18, wherein the processor is configured to:

initiate a random access to the base station through the first SIM in response to no third SIM being queried.

* * * * *